(12) United States Patent
Franks et al.

(10) Patent No.: US 8,527,506 B2
(45) Date of Patent: *Sep. 3, 2013

(54) MEDIA DISCOVERY AND PLAYLIST GENERATION

(75) Inventors: Kasian Franks, Kensington, CA (US); Raf Podowski, Pleasant Hill, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/339,076

(22) Filed: Dec. 28, 2011

(65) Prior Publication Data

US 2012/0102017 A1 Apr. 26, 2012

Related U.S. Application Data

(63) Continuation of application No. 12/147,249, filed on Jun. 26, 2008, now Pat. No. 8,117,185.

(60) Provisional application No. 60/946,350, filed on Jun. 26, 2007.

(51) Int. Cl.
*G06F 7/00* (2006.01)
*G06F 17/30* (2006.01)

(52) U.S. Cl.
USPC .......................................... 707/722; 707/767

(58) Field of Classification Search
USPC ................................................ 707/767, 722
See application file for complete search history.

(56) References Cited

U.S. PATENT DOCUMENTS

| | | | |
|---|---|---|---|
| 6,026,388 A | 2/2000 | Liddy et al. | |
| 6,523,026 B1 | 2/2003 | Gillis | |
| 6,687,690 B2 | 2/2004 | Kelkar | |
| 7,853,586 B1 * | 12/2010 | Patel et al. | 707/722 |
| 7,937,403 B2 * | 5/2011 | Kehl | 707/767 |
| 8,001,101 B2 * | 8/2011 | Anderson et al. | 707/706 |
| 8,037,070 B2 * | 10/2011 | Maghoul | 707/736 |
| 8,117,185 B2 * | 2/2012 | Franks et al. | 707/713 |
| 8,200,688 B2 * | 6/2012 | Messer et al. | 707/767 |
| 8,230,467 B2 * | 7/2012 | Faulkner et al. | 725/86 |
| 8,250,613 B2 * | 8/2012 | Faulkner et al. | 725/86 |
| 8,275,759 B2 * | 9/2012 | Imig et al. | 707/706 |
| 2002/0069098 A1 * | 6/2002 | Schmidt | 705/7 |

(Continued)

OTHER PUBLICATIONS

International Search Report and Written Opinion for PCT/US2006/21662 dated Mar. 13, 2007.

(Continued)

*Primary Examiner* — Hung T Vy
*Assistant Examiner* — Muluemebet Gurmu
(74) *Attorney, Agent, or Firm* — Finnegan, Henderson, Farabow, Garrett & Dunner, LLP

(57) ABSTRACT

A computer implemented method and system that generates a video playlist having recommended videos based on a user query object is disclosed. A user query object is used to search for a number of web pages. Summaries are generated for the returned web page search results. Valuable terms and phrases from those summaries may be extracted and used to search video storage sites based on the original user query. Playable videos returned from the video storage sites may be compared to the user query or to the extracted terms and phrases in order to rank the videos, and the most relevant videos may be returned. Those videos may be displayed to the user as a playlist in an Internet browser having an embedded video player.

18 Claims, 24 Drawing Sheets

(56) References Cited

U.S. PATENT DOCUMENTS

| | | | |
|---|---|---|---|
| 2002/0188599 A1 | 12/2002 | McGreevy et al. | |
| 2002/0194197 A1* | 12/2002 | Flank | 707/104.1 |
| 2003/0033288 A1 | 2/2003 | Shanahan et al. | |
| 2004/0064471 A1 | 4/2004 | Brown et al. | |
| 2005/0038819 A1 | 2/2005 | Hicken et al. | |
| 2005/0120011 A1 | 6/2005 | Dehlinger et al. | |
| 2006/0010126 A1 | 1/2006 | Anick et al. | |
| 2006/0036593 A1 | 2/2006 | Dean et al. | |
| 2006/0129531 A1* | 6/2006 | Bates | 707/3 |
| 2006/0265349 A1 | 11/2006 | Hicken | |
| 2007/0014537 A1 | 1/2007 | Wesemann | |
| 2007/0033225 A1 | 2/2007 | Davis | |
| 2007/0106660 A1 | 5/2007 | Stern et al. | |
| 2008/0189272 A1 | 8/2008 | Powers et al. | |
| 2008/0243830 A1* | 10/2008 | Abhyanker | 707/5 |
| 2010/0223151 A1 | 9/2010 | Kon et al. | |
| 2010/0325100 A1 | 12/2010 | Forstall et al. | |
| 2011/0145229 A1 | 6/2011 | Vailaya et al. | |

OTHER PUBLICATIONS

International Search Report and Written Opinion for PCT/US2007/083992 dated May 16, 2008.

International Search Report and Written Opinion for PCT/US2007/082892 dated Jun. 24, 2008.

International Search Report and Written Opinion for PCT/US2008/059308 dated Jul. 2, 2008.

International Search Report and Written Opinion for PCT Application No. PCT/US2008/068401 dated Sep. 30, 2008.

Baccigalupo et al., "Case-based sequential ordering of songs for playlist recommendation" Advances in Case-Based Reasoning, 8th European Conference, ECCBR 2006 Proceedings Sep. 4-7, 2006 Fethiye, Turkey, [Online].

Dou Shen et al., "Thread detection in dynamic text message streams", SIGIR '06: Proceedings of the 29th Annual International ACM Sigir Conference on Research and Development in Information Retrieval [Online] Aug., 2006.

Kolda et al., "A Semidiscrete Matrix Decomposition for Latent Semantic Indexing in Information Retrieval" ACM Transactions on Information Systems, ACM, New York, NY, vol. 16, No. 4, Oct. 1, 1998. pp. 322-346.

Office Action mailed Oct. 4, 2010, for related U.S. Appl. No. 12/147,249, filed Jun. 26, 2008.

Response to office action dated Jan. 7, 2011, for related U.S. Appl. No. 12/147,249, filed Jun. 26, 2008.

Final Rejection mailed Mar. 30, 2011, for related U.S. Appl. No. 12/147,249, filed Jun. 26, 2008.

Response to Final Rejection dated Jul. 20, 2011, in U.S. Appl. No. 12/147,249, filed Jun. 26, 2008.

Notice of Allowance mailed Sep. 28, 2011, in U.S. Appl. No. 12/147,249, filed Jun. 26, 2008.

* cited by examiner

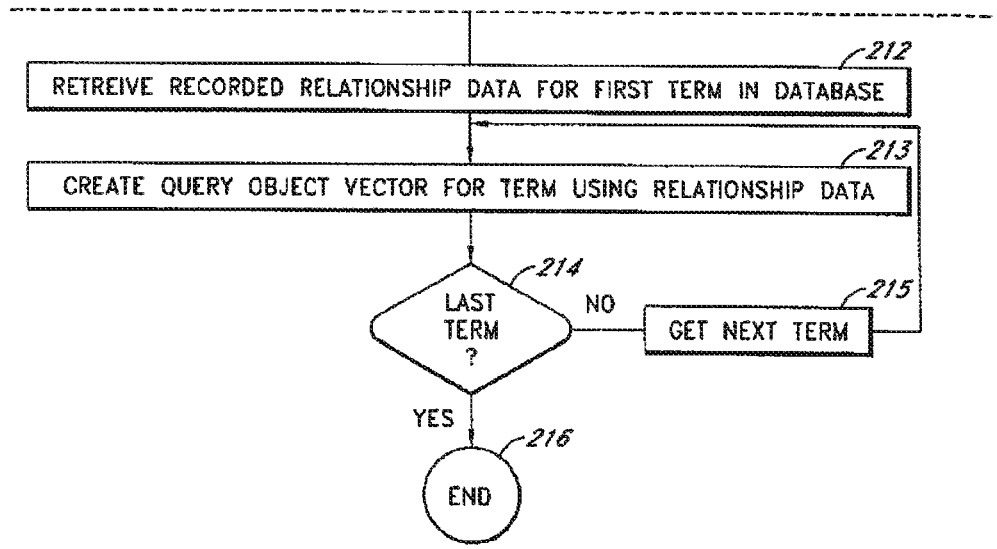
FIG. 2B
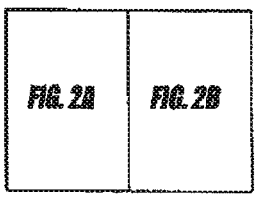

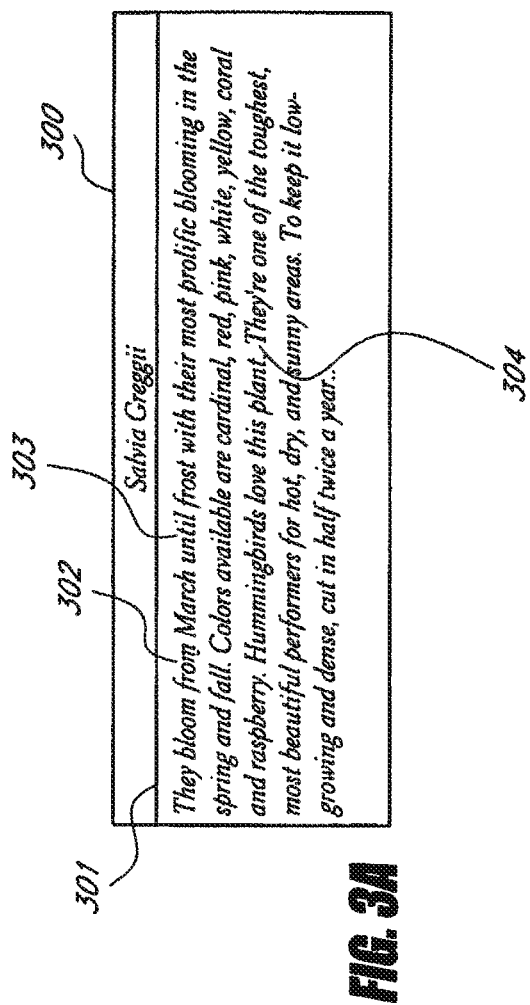

FIG. 4

| Doc.ID | Term 1 | Term 2 | Term 3 | Term 4 | Term 5 | Term 6 | Term 7 | Term 8 | Term 9 |
|---|---|---|---|---|---|---|---|---|---|
| Salvia Greggii | bloom | March | frost | Prolific | blooming | Spring | fall | coral | raspberry |
| Salvia Greggii | Colors | available | cardinal | Red | pink | White | yellow | coral | areas |
| Salvia Greggii | Hummingbirds | Love | plant | Performers | hot | Dry | sunny | | |
| Salvia Greggii | one | toughest | beautiful | Dense | cut | Half | twice | | |
| Salvia Greggii | keep | low | growing | | | | | | |

FIG. 5

| Term Statistics: | |
|---|---|
| # Occurrences in Analyzed Text | 1 |
| # Sentences | 1 |
| # Associated Terms | 18 |
| # Individual Associations | 18 |

| Document Statistics: | | |
|---|---|---|
| Document ID | Sentences | Total Score |
| Salvia Greggii | 1 | 1 |

| Associated Term Statistics: | | | |
|---|---|---|---|
| Associated Term | #Associations | Distance Score | |
| Cardinal | 1 | 0.618 | |
| Pink | 1 | 0.618 | |
| White | 1 | 0.381 | |
| *** | | | |
| Plant | 1 | 0.021 | |
| March | 1 | 0.013 | |
| Bloom | 1 | 0.008 | |

| Term Statistics: | |
|---|---|
| # Occurrences in Analyzed Text | 12 |
| # Sentences | 12 |
| # Associated Terms | 319 |
| # Individual Associations | 450 |

| Document Statistics: | | |
|---|---|---|
| Document ID | Sentences | Total Score |
| Gardening Journal | 4 | 4 |
| Salvia Greggii | 3 | 3 |
| ⁎⁎⁎ | | |
| Top News Stories | 1 | 1 |

| Related Term Statistics: | | |
|---|---|---|
| Related Term | # Associations | Distance Score |
| Cardinal | 6 | 4.124 |
| Maroon | 2 | 2.000 |
| Pink | 4 | 1.641 |
| Raspberry | 2 | 1.381 |
| White | 5 | 1.347 |
| ⁎⁎⁎ | | |
| Paste | 1 | 0.008 |

FIG. 6A

| Rank | Term | Relationship Score |
|---|---|---|
| 1 | Cardinal | 1.052 |
| 2 | Maroon | 1.029 |
| 3 | Pink | 1.013 |
| 4 | Raspberry | 0.984 |
| 5 | White | 0.947 |
| ⁎ ⁎ ⁎ | | |
| 319 | Paste | 0.014 |

FIG. 6B

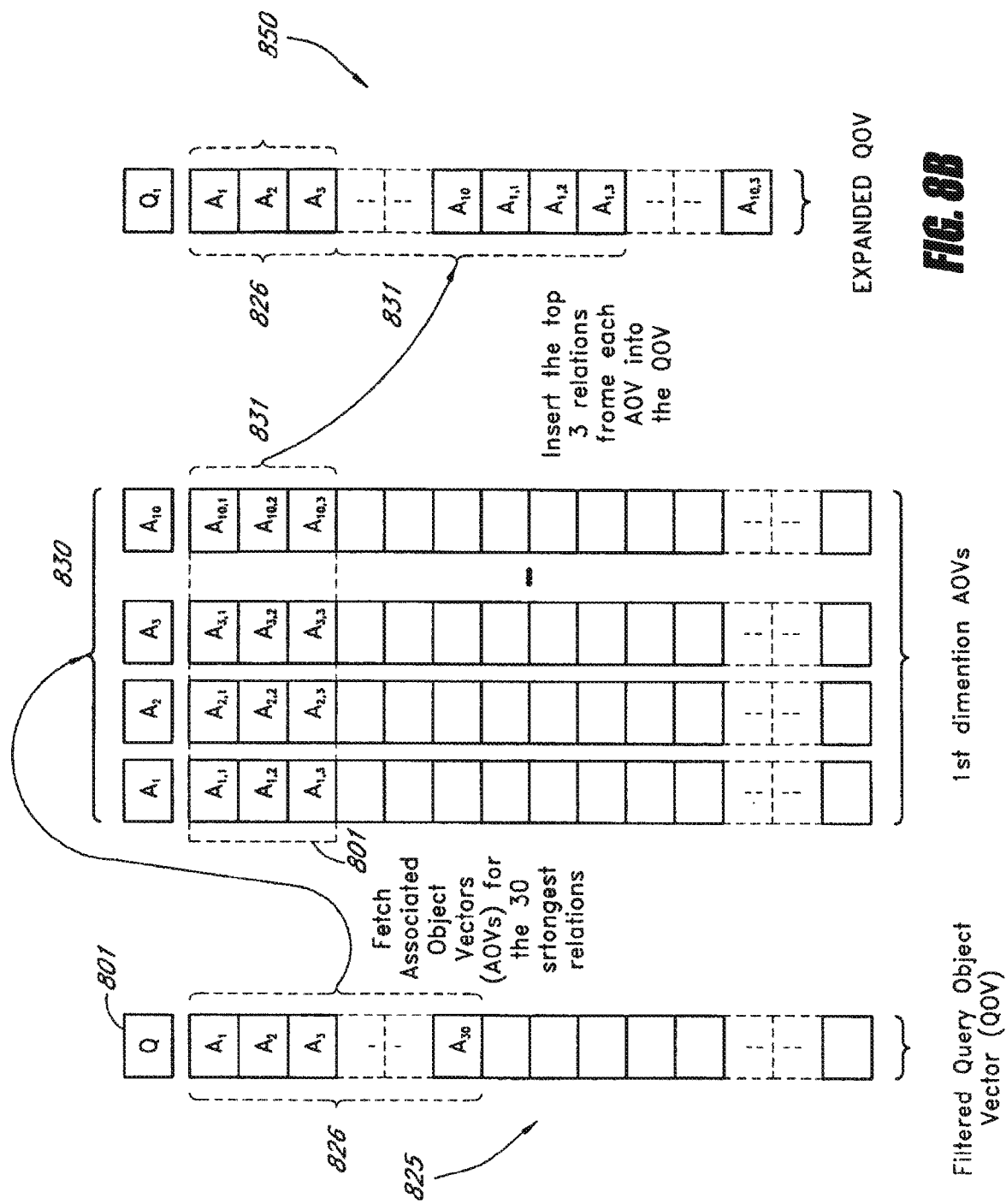

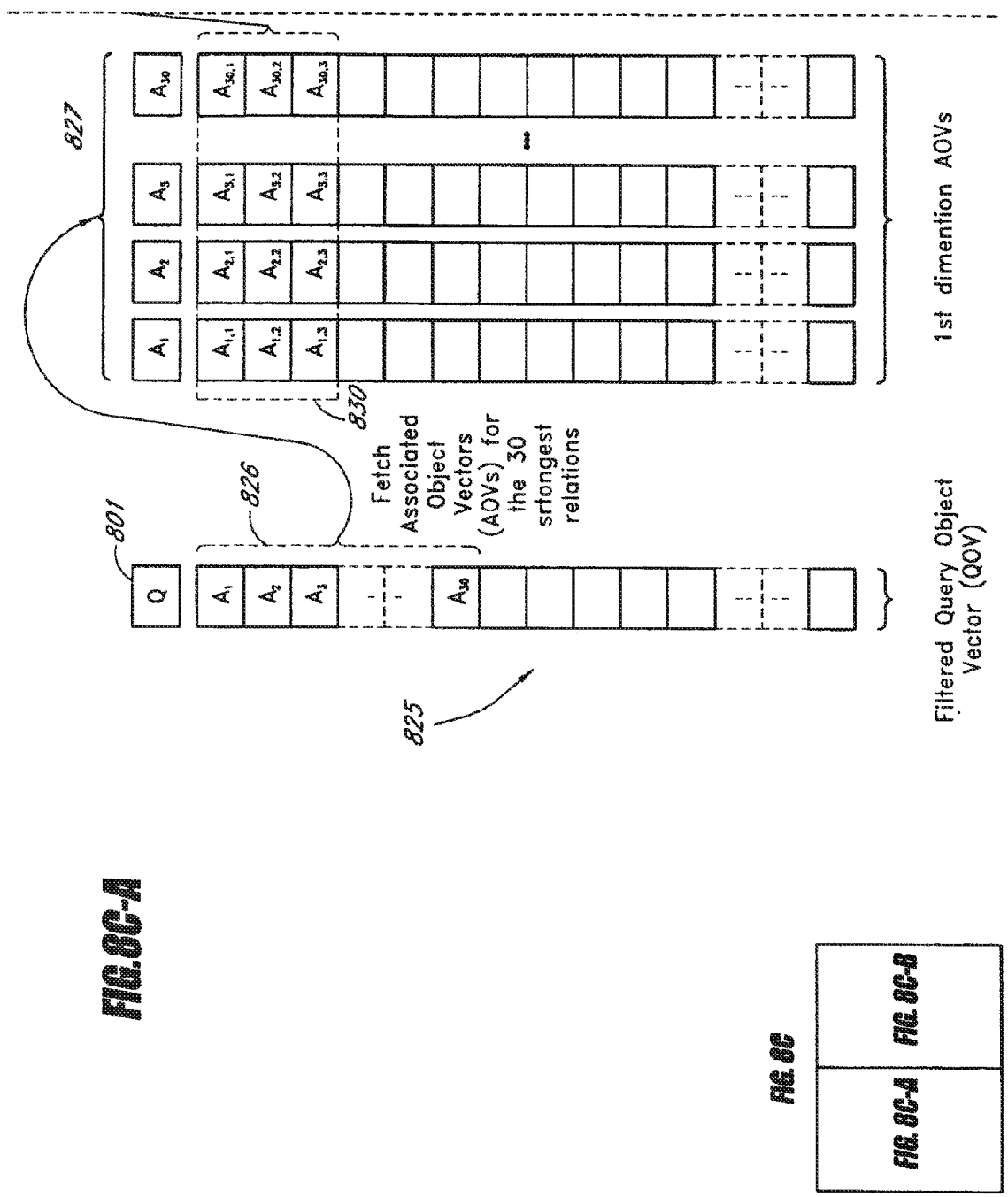

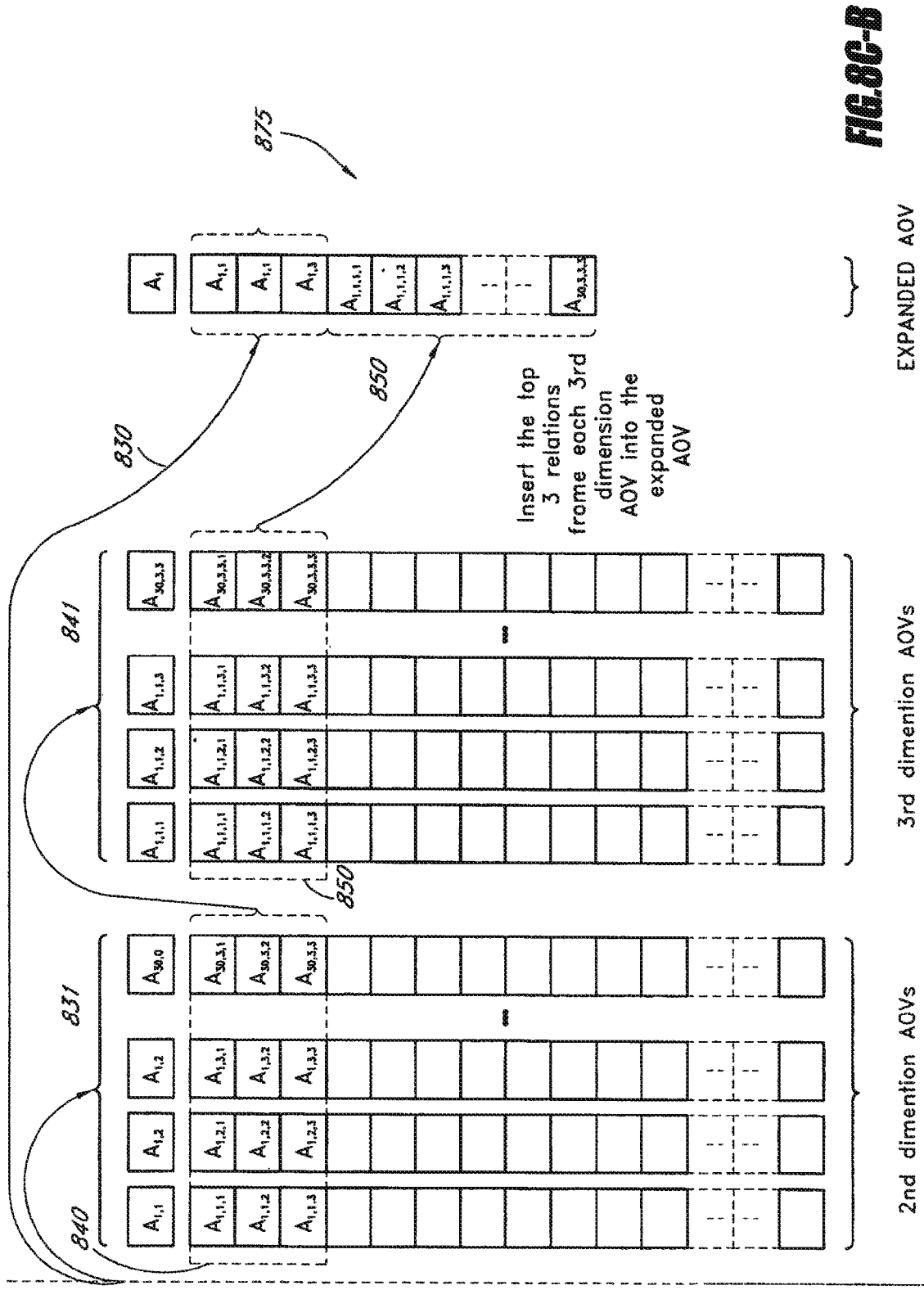
FIG. 8c-B

FIG 8D $\Pi(A_1) = \boxed{T_1\ T_2\ T_3\ T_4\ T_5}$ $Q\ \bigcap\ A_1$

Expanded QOV: $Q\ [\ \ |\ \ |T_1|T_2|\ \ |\ \ |T_3|T_4|\ \ |\ \ |\ \ |T_5|\ \ |--|\ \ ]$ $A_1\ [T_1|T_2|\ \ |\ \ |T_1|\ \ |\ \ |\ \ |T_2|\ \ |\ \ |\ \ |\ \ |T_3|--|\ \ ]$ Find the intersection between each expanded AOV and the expanded QOV — 875

Expanded AOVs: $A_1, A_2, A_3, \ldots, A_{30}$ 880, 850, 875

| Doc ID | Term 1 | Term 2 | Term 3 | Term 4 | Term 5 | Term 6 | Term 7 | Term 8 | Term 9 |
|---|---|---|---|---|---|---|---|---|---|
| Salvia Greggii | bloom | March | frost | Prolific | blooming | Spring | fall | | |
| Salvia Greggii | Colors | available | cardinal | Red | pink | White | yellow | coral | raspberry |
| Salvia Greggii | Hummingbirds | Love | plant | | | | | | |
| Salvia Greggii | one | toughest | beautiful | Performers | hot | Dry | sunny | areas | |
| Salvia Greggii | keep | low | growing | Dense | cut | Half | twice | year | |
| * * * | | | | | | | | | |

FIG. 15

| Rank | Term | Relationship Score |
|---|---|---|
| 1 | $T_1$ | $S_1$ |
| 2 | $T_5$ | $S_2$ |
| 3 | $T_3$ | $S_3$ |
| 4 | $T_4$ | $S_4$ |
| 5 | $T_5$ | $S_5$ |
| N | $T_N$ | $S_N$ |

FIG. 16

MEDIA DISCOVERY AND PLAYLIST GENERATION

CROSS-REFERENCE TO RELATED APPLICATIONS

This application claims priority to U.S. patent application Ser. No. 12/147,249, filed on Jun. 26, 2008, which claims the benefit of U.S. Provisional Patent Application No. 60/946,350, filed on Jun. 26, 2007, the disclosures of which are incorporated herein by reference in their entirety.

BACKGROUND OF THE INVENTION

1. Field of the Invention

This application relates to information storage retrieval systems. More particularly, this application relates to a system for retrieving playable videos related to a search query object and displaying those results in a video playlist to a user.

2. Description of the Related Art

Phrase based or keyword searching is a common method of searching used for electronic data. Keyword searching searches throughout an information database for instances of the words in the search query. Keyword searching does not, however, give results based on relevance; search query results often include items with no relevance or relationship to one another other than the instance of a word in the search query. For example, a user intending to search products by the technology company Apple may enter the search query "Apple." The search results, however, would likely include items relating to the apple fruit, songs by the music label Apple, and so on. Consequently, the search query results of phrase based searching often have nothing in common with the user's search intent.

Search methods which relate one object to another object are often used in place of keyword searching in order to provide search query results relevant to the searcher's intent. Such relationship-based search methods vary widely and range from precise to general catch-all approaches. Methods relating text objects can vary widely in precision and approach, quality and quantity. For example, Caid et al., in U.S. Pat. No. 5,619,709, titled "System and Method of Context Vector Generation and Retrieval" relies on context vector generations and dated neural network approaches as opposed to more advanced auto-associative approaches. Weissman et al, in U.S. Pat. No. 6,816,857, uses methods of distance calculation to determine relationships for the purpose of placing meaning-based advertising on websites or to rate document relevance in currently used search engines.

These relationship based searches do not, however simulate the process that a human would use in analyzing relevant information to relate objects with one another. Starting with an object of interest, a researcher typically researches within certain contexts and forms relationships between information gathered during the process of reading and analyzing literature. During this flexible process, the context of interest may change, become refined or shift and take on a new direction depending on the information found or thought processes of the researcher. After the researcher finishes the research process, he is left with a valuable collection of information that is related to a specific theme or context of interest. For example, if the researcher's object of interest was a period of music and the context was the Baroque style, then a researcher might relate compositions to one another, compositions to a composer, compositions to a geographical location or time period. Common relationship-based searches do not simulate this process because they are both inflexible and non-interactive; they neither allow a user to define and control the context and individual relationships during the search, nor do they allow for the quality and quantity of relationships to be determined and visualized interactively by the user.

Furthermore, these systems do not identify playable media related to the user query object that may have hidden relationships or that are not directly related to with the query object. Additionally, these searches do not ideally present retrieved playable media. For example, key word and relationship based searches may return videos or media related to a user query as an alternative to returning web page results. However, the media results are based on direct relationships to the query term itself and may not reveal hidden relationships or highlight contextual relationships to the query term. Thus, information corresponding to hidden relationships between the query object and the playable media that may be useful to a user is not available using these search techniques.

SUMMARY OF CERTAIN INVENTIVE ASPECTS

Certain embodiments herein provide for a system and computer-implemented method for generating a video playlist. It should be understood while the term "video playlist" is used herein to describe a result page from the search having playable media thereon, it is not limited to providing video-based results to a user. Other results that include audio, photographs, and other media objects are also contemplated.

In one embodiment, a system to generate a video playlist is provided. First, web page search results are retrieved based upon a query object provided by a user. Well known companies that provide such search results include GOOGLE, YAHOO, and MICROSOFT. Once those search results have been returned, the system analyzes the content on each web page that was returned in the search. Summaries of the content from these web pages are then used to generate ranked terms and phrases. These ranked terms and phrases may be provided to video storage sites in order to return a collection of playable videos. Video storage sites include, for example, YOUTUBE, and GOOGLE VIDEO. The returned playable videos are ranked based on the content surrounding each of the playable videos and the original search result summaries. The ranked videos are returned to the user on a web page having an embedded video player for playing the returned videos. Thus, a video playlist website is created that contains playable videos that are directly, contextually, and indirectly related to the user query. The created playlist may therefore comprise, for example, a personal user video channel including recommended videos based upon the user query.

In another embodiment, a computer system for returning a list of playable media objects to a user is provided. The system includes a server configured to receive a search query object from the user. The system also includes a first module configured to identify additional terms related to the search query object by providing the search query object to at least one search engine and processing results returned by the search engine and a second module configured to query one or more video storage locations based on the identified additional terms to obtain a list of playable media objects stored on the one or more video storage locations, the playable media objects comprising the identified additional terms.

In still another embodiment, a computer implemented method of generating a list of playable media objects is provided. The method includes receiving a search query object and querying at least one search engine with the search query object. The method further includes generating additional terms related to the search query object based on results returned by the search engine and identifying media storage locations having playable media objects related to the generated additional terms. A list of playable media objects is generated from the playable media objects at the media storage locations.

BRIEF DESCRIPTION OF THE DRAWINGS

FIG. 3A shows a sample document from an information database containing text documents.

FIG. 3B shows the document of FIG. 3A after it has been parsed.

FIG. 4 shows one embodiment of a frame for use with the sample data of FIGS. 3A and 3B.

FIG. 5 shows a sample associative memory module for the term "red" from FIG. 4 at a state where the current term being analyzed in the frame is the core term "red."

FIG. 6A shows the associative memory module for the term "red" after the system completes its analysis of the information database containing the document of FIG. 3A.

FIG. 6B shows the sample query object vector for the associative memory module of FIG. 6A.

FIG. 8B shows one sample method to generate an expanded query object vector using the filtered query object vector of FIG. 8A.

FIG. 8C shows one sample method to generate expanded associated object vectors using the filtered query object vector of FIG. 8A.

FIG. 8D shows one sample method to use expanded associated object vectors with an expanded query object vector to find associated terms between the associated object vectors and the expanded query object vector in order to produce search results for a query.

FIG. 15 shows one embodiment of a system for analyzing sections of an object in an electronic database at a state where the first section and first term have been selected.

FIG. 16 shows a sample query object vector.

DETAILED DESCRIPTION OF THE CERTAIN INVENTIVE EMBODIMENTS

Figure 1:
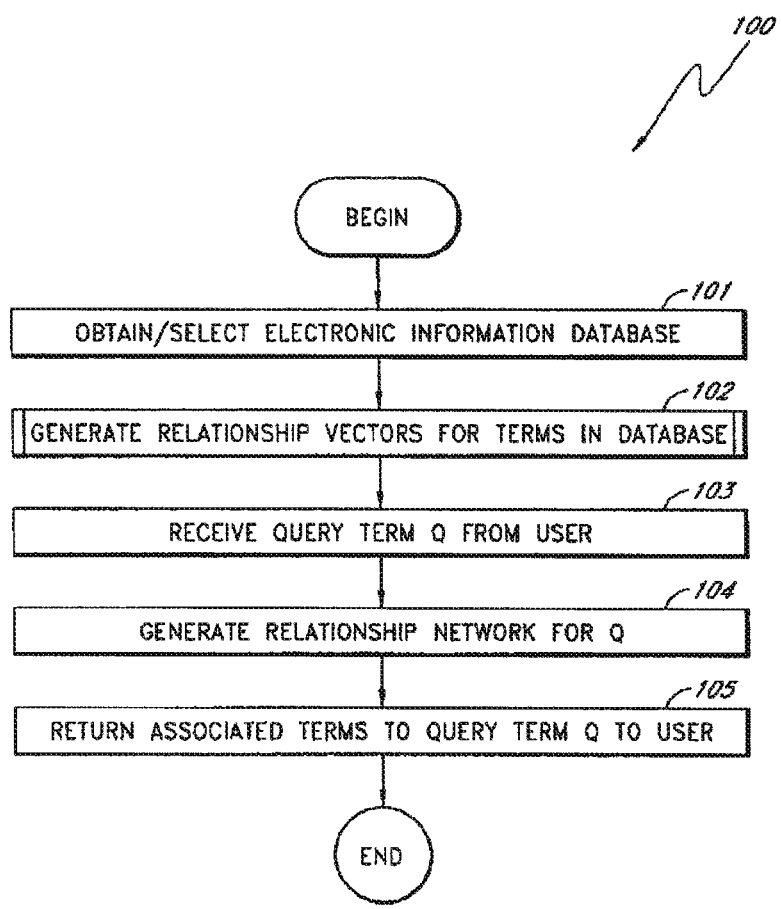
FIG. 1 is a flow chart for one embodiment of a system for generating a relationship network

In the following description, reference is made to the accompanying drawings which show, by way of illustration, specific embodiments and applications of the systems and methods described herein. Where possible, the same reference numbers are used throughout the drawings to refer to the same or like components. In some instances, numerous specific details are set forth in order to provide a thorough understanding of the present disclosure. The presently described embodiments, however, may be practiced without the specific details or with certain alternative equivalent components and methods to those described herein. In other instances, well-known components and methods have not been described in detail so as not to unnecessarily obscure aspects of the present disclosure.

One disclosed embodiment is a computer method and system that generates a video playlist having recommended videos based on a user query object. In one embodiment, the user query object is used to search for a number of web pages. Summaries are generated for those web pages. Valuable terms and phrases from those summaries may be extracted and used to search video storage locations. Playable videos returned from the video storage sites may be compared to the user query or to the extracted terms and phrases in order to rank the videos, and the most relevant videos may be returned. Those videos may be displayed to the user as a playlist in an Internet browser having an embedded video player.

Another disclosed embodiment is a computer method and system that creates and discerns relationships between different items in a collection. In one embodiment, a many-to-many relationship is created between data items in a data set. As one example, the data items may be genes, and the data set may be the GENBANK gene database. As will be described in more detail below, embodiments of the system analyze the data items in the data set and thereafter create variable length data vectors, such as query object vectors, that reflect the relationships between the data items in the dataset. The data vectors can then be stored and used as part of data mining tool which analyzes relationships between the data items. For example, one may search for all genes in Genbank that relate to stomach cancer.

In one embodiment, the data vectors that mark associations between data items are created by first analyzing direct correlations between two data items, and then looking for further, hidden, associations between the data items. In one embodiment, these hidden relationships are determined by iteratively analyzing the distance that each term in the dataset has from other terms. Thus, for example, the more times that two words are found to be associated with one another in the data set, the closer the relationship between them is formed. In certain embodiments, terms are analyzed by moving a "frame" through each data item. For example, if the data item is a document, the frame may move through the document one line at a time, but covering three lines. As the frame moves down each line of the document, the distance between terms within the frame is analyzed. During this analysis, data vectors are created which store the relationships between each term in the frame. In one embodiment, each term within the entire dataset is represented by one vector. That vector provides the distances and relationships between that term and its related terms.

Another embodiment includes a system and method of using the stored data vectors to provide useful results of a search inquiry. When a person or machine inputs a term as part of a search, the data vector for that term is located, and the terms most relevant to the search term are identified from the data vector. The system then retrieves the data vectors for the most relevant terms in order to expand the search. The terms that are related to the most relevant terms can then be identified, and the process can continue to build a relationship network between the original search term, and all of its related terms. Once the queries are executed and the vectors containing the most relevant terms are scored, a relationship network is built. The resulting network of the submitted term may then be prepared for visualization for further interpretation. In one embodiment, the terms are displayed on a computer screen with a web of links showing how related each search term was to its results. To ensure that the submitted terms stay within a specific context when a relationship network is being built, a thematic context in the form of a filter can be used to control the kind of relationships extracted within the resulting network.

The systems and methods disclosed herein allow a user to interactively engage in information mining, hidden association and connection extraction, relationship network construction and comparison of objects while interactively applying thematic context controls to refine the type of relationships extracted. The systems and methods provide the user with information on how objects within the information database relate to one another, in what contexts they are related, and the strength of their relationship.

By combining an interactive role for the user, similar to what a researcher engages in during the process of experimentation, and applying it to an iterative process of automated text mining methods, certain embodiments discussed herein give the user the ability to choose the direction and define relationships as connections are made between objects of interest in the information searched. Interactively defining and extracting relationships between objects, themes and other contexts provides a valuable level of precision for relationship exploration and discovery in text.

For example, if a user was searching for Baroque compositions in an electronic information database such as the Internet, the user may submit the term "Baroque" to the relationship network system. The user may also choose to direct the search in the direction of Baroque music by using a filter term such as "compositions" in order to avoid results relating to Baroque art. The system would then not only provide information on compositions strongly associated with the term "Baroque," but also for compositions strongly associated with terms related to "Baroque," such as composer names "Bach" and "Handel," compositions involving instruments associated with Baroque music, such as "viola da gamba" or "harpsichord", or the related art period, "Classical," and so on.

In one embodiment, the relationship network system disclosed herein may be used for term disambiguation, which provides the ability to distinguish two strings of characters that are exactly the same but that have different meanings dependent upon context such as acronyms that double as identifiers or symbols or actual words. For example, the word "cleave" has two definitions that are opposite of one another.

FIG. 1 shows a process 100 for generating a relationship network using an electronic information database. In certain embodiments, an electronic information database may include, but is not limited to, a collection of characters or other forms of text, images, audio, video, or any other data that may be analyzed electronically. Objects or terms within the information database may thus be documents, characters, words, images, songs, or videos ("terms").

In the embodiment illustrated, the system first selects an electronic information database to process at a state 101. In one example, the database is a database of musical compositions. The system then creates vectors for terms within the database at a process state 102 (described in more detail with respect to FIG. 2. The vectors are created in a way to capture the different strengths of relationships between compositions within the database. Once the vectors are created, the system receives a query "Q" from the user at a state 103. A query is undertaken, for example, when a user would like to find compositions similar to composition listed in the query Q. In certain embodiments, the system may create the vectors before receiving a query in order to reduce data processing expenditures in response to the query. In other embodiments, the vectors may be created after the query is received. Although in certain embodiments a vector is used to store relationships between terms, other data structures may be used in other embodiments. In certain embodiments using vectors, the vector space representation scheme uses variable length query object vectors. The variable length vector may have a plurality of component values or elements that are determined based on relationships between terms. In addition, the variable length vectors may be sized based on the number of associated terms within each vector.

In certain embodiments, associated terms are terms that have either a direct or indirect relationship with each other. In some embodiments, the one term is a "first" term and the second term is a "core term". In certain embodiments, a direct relationship is where a core term is found within the same frame in a vector as the associated term. In certain embodiments, an indirect relationship is where a core term and the associated term each share a common term in their respective vectors. Other relationships between terms may also be generated for use with certain embodiments discussed herein.

Returning to FIG. 1, in response to a query for term Q from a user at the state 103, the system then generates a relationship network for Q at a state 104 based on the variable length vector(s) for the term Q. In certain embodiments, a relationship network is comprised of a network of relationship vectors whose connections to each other, and the strength of those connections, are based on shared unique attributes within a defined context and theme. Contexts and themes are discussed more specifically below. Once the relationship network has been generated at the state 104, the system may then return terms that are associated with Q at a state 105. For example, the returned terms may point to compositions that are by the same composer as Q, compositions related to Q, or recommendations based on Q.

1. Generating Vectors for a Relationship Network

Figure 2A:
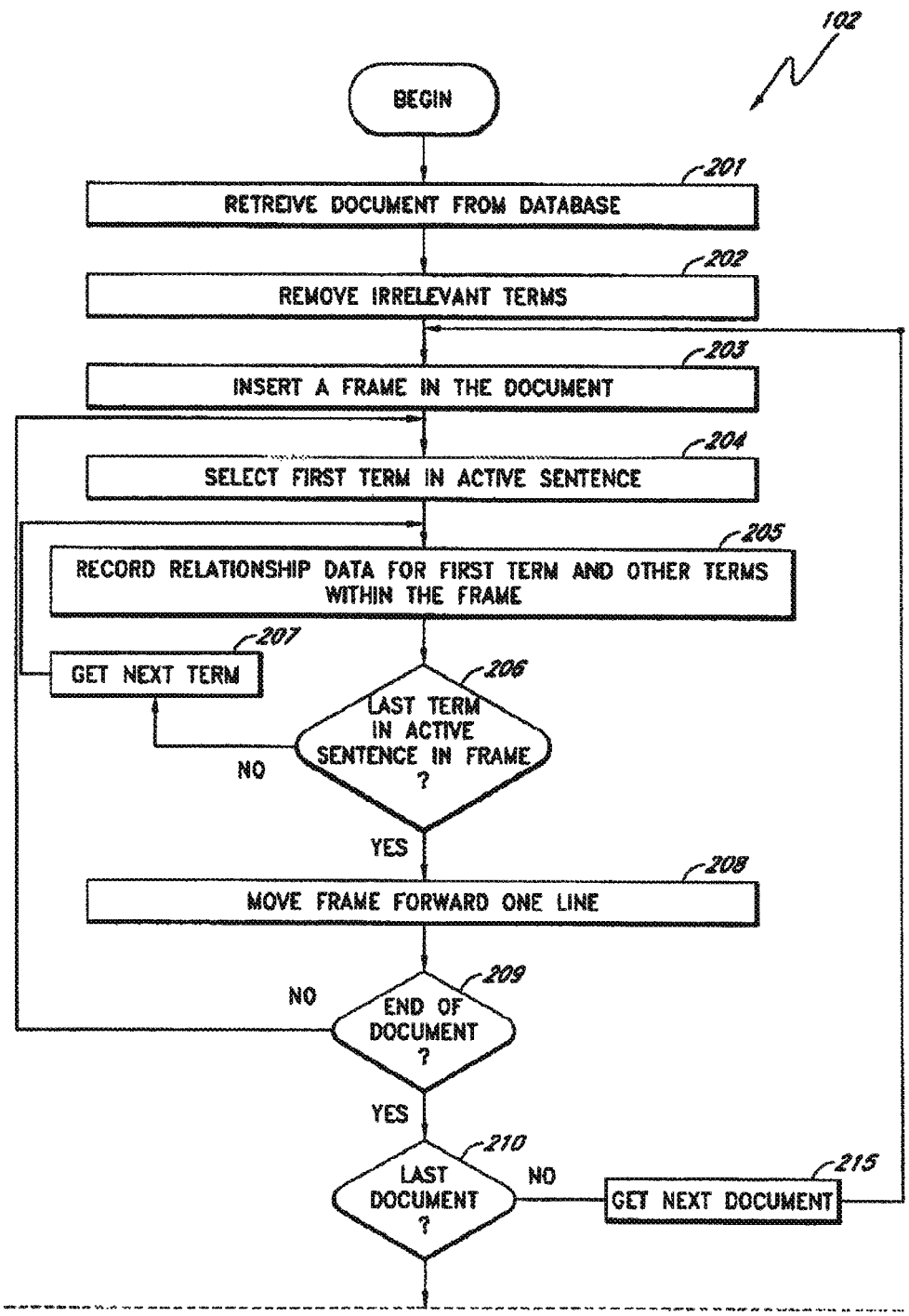
FIG. 2 is a flow chart for one embodiment of a system for generating vectors for use with a relationship network based on an electronic information database containing text documents.

FIG. 2 is a flow chart for one embodiment of the process 102 of generating variable length vectors from data stored within a database. The process 102 gathers each document in the database at a state 201. For each document that is gathered, the document is parsed at a state 202 in order to remove irrelevant or low value data, such as stop-words (common words such as a, of, as, the, on, etc.). After each document has been parsed at the state 202, the information database contains only valuable terms.

Then, for each parsed document, the system inserts a frame at a state 203 in the document. The frame can be thought of as an overlay that covers one or more lines of text in the documents. For example, the frame may cover three lines or sentences in the document. Once the frame has been inserted at the state 203, the process 102 moves to a state 204 wherein the first term in the first line processed in the frame is selected. FIG. 4 shows one embodiment of a frame 400 for use with the sample data illustrated in FIGS. 3A and 3B. After the first term in the active sentence of the frame is selected at the state 204, a set of relationship data is generated between the first term ("core term") and the other terms within the frame ("associated terms") at a state 205. The system records the relationship data for the core term, which includes data such as a calculated distance score for each core term from the first term. In certain embodiments, the relationship data may be stored in an associative memory module, as shown in FIG. 5. Once the relationship data has been generated for the first term, the process 102 moves to a decision state 206 wherein a determination is made whether the last term in the active sentence of the frame is being analyzed. If the current term is not the last term, then the process 102 moves to a state 207 wherein the next term within the frame is captured. The process 102 then returns to the state 205 to calculate the relationship data between the newly captured term and the other core terms within the frame at the state 205. If the term being processed is the last term in the active sentence of the frame, then the process 102 moves to a state 208 wherein the frame is moved ahead by one sentence or line in the document under analysis. If the term is not the last term in the active sentence for the frame, the process 102 moves back to state 205.

Once the process 102 has moved the frame ahead by another line or sentence, a determination is made whether or not the frame is at the end of the document at a decision state 209. If a determination is made that the process 102 is not at the end of the document, then the process 102 returns to the state 204 wherein the first term within the active sentence of the moved frame is selected. If a determination is made that the frame is at the end of the document, then the process 102 moves to a decision state 210 where a determination is made whether or not the process is at the last document in the database. If the process 102 is not at the last document in the database, then the process 102 moves to a state 211 wherein the next document within the database is selected. The process 102 then returns to the state 203 wherein a frame is inserted into the newly gathered document.

Figure 6B:
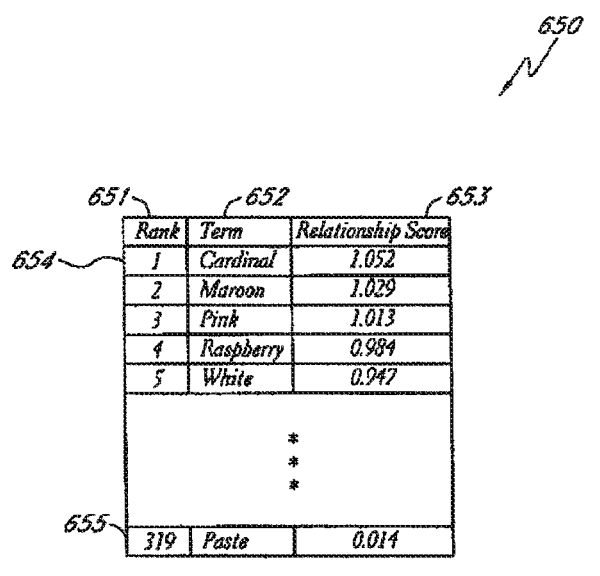

If a determination is made at the decision state 210 that the process 102 is at the last document, then the process moves to state 212 where it retrieves the recorded relationship data, such as from the associative memory module, for the first term in the database. Then the process moves to state 213 where a variable length query object vector is created using the relationship data from state 212. In certain embodiments, the relationship data values from state 212, which may be stored in a query object vector, may be enhanced when stored in the query object vector. Examples of enhancing the relationship data values include increasing the data values of unique associations and decreasing the data values for common associations. FIG. 6B shows the sample query object vector for the associative memory module of FIG. 6A. Next, the process moves to decision state 214 then checks to determine if the term analyzed is the last term in the database. If it is not the last term analyzed, the process moves to state 215 wherein the next term within the database is selected. The process 102 then returns to the state 213 wherein a query object vector for the next term is created. If a determination is made at the decision state 214 that the process 102 is at the last term, then the process terminates at the end state 216.

FIG. 3A shows a sample document 300 from an information database containing text documents. FIG. 3B shows the stored data from the document of FIG. 3A after it has been parsed 310. As it can be seen from the differences between FIGS. 3A and 3B, in this embodiment the system removed stop-words such as "they" 301 "from" 302 "until" 303 and "they're" 304 and also organized each sentence according to the identification of the document 311 it was found in and its terms 312.

As shown in FIG. 4, one embodiment of the context or frame 400 consists of associated terms surrounding and ultimately associated with the current, core term being analyzed in the frame, "red" 412. In one embodiment, the frame 400 and the space it encompasses are constructed by using distance thresholds within documents. For example, in FIG. 4, the distance threshold is one sentence before and one sentence after the sentence containing the core term being analyzed 410. If a term is within the distance threshold, it is considered an associated term and it becomes part of the context frame 400. On the other hand, if a term is outside the distance threshold, it will not become part of the context frame 400 and does not receive a distance score (also referred to as a score association) to the core term. Using the number of words in a document as well as number of sentences, paragraphs, characters or other objects, distance thresholds can be calculated and the size of the framed context 400 will grow and fluctuate as documents are read in and new statistical data is gathered. In one embodiment, wherein the digital content to be analyzed is raw text documents, the frame 400 is set to three, four or five sentences per frame. The example in FIG. 4 has a three sentence context frame 400.

The system may move the frame 400 through the documents or other parsed data which comprise the information database. As the frame is moved line by line through a set of documents, terms can be automatically associated with one another including an identifier representing the operative document 311. As terms flow in and out of the frame that moves through the documents, associated terms can define their strength of association to the core term by distance scores. For example, in FIG. 4, after the system has calculated the distance scores for the core term "red," the focus of the frame will move to the next term, "pink," until the focus reaches the final term in the middle line of the frame, "raspberry." After the system has calculated the distance scores for terms associated with the term "raspberry", the frame will advance by one line and the core term focus will begin with the first term on the next line, "Hummingbirds." Furthermore, the sentence beginning with the term "bloom" will flow out of the frame and the sentence beginning with the term "one" will flow into the frame.

By giving a distance score to each associated term, each core term 410 in the document becomes a statistically important object containing a family of relationship scored associative terms as elements of its associative memory module. The distance score between two terms may then be used to create a relationship score between two terms after the process completes analysis of the entire information database. For example, in one embodiment, distance scores between two terms as they appear repeatedly within a frame throughout the information database may be summed to create a relationship score.

Frame 400 usage in single documents becomes especially advantageous when relationship scores are generated over thousands or millions of documents. In certain embodiments herein, significant relationships between words are defined over time by strong and unique connections between two or more terms. Relationship scores to a term can be compared to the way a person might learn by repetition. A person will tend to remember and associate two terms together if he hears them together on a repeated basis, whereas a person may not remember or associate two terms together if he does not hear them together very often. In certain embodiments discussed herein, the system gives a high relationship score to two or more terms which appear often together. In certain other embodiments, two or more terms sharing a very unique set of attributes are scored highly.

As discussed above, the system may store relationships between a core term 410 and its associated term in file called an associative memory module that is created for the core term. In one embodiment, an associative memory module is a database schema storing information related to statistical and distance-based object associations, as well as document statistics. The associative memory module may thus advantageously capture meaning sensitivity in the data to be searched, which requires that the closeness of every pair of terms be known, scored for distance and stored. Thus, associative memory modules may advantageously store information such as words, paragraphs, search queries, objects, documents, document identifiers, parts of images, parts of terms, parts of text, parts of sequences or any piece of an object that has been split into parts, terms and documents, and many other types of information items similarly represented, such as numerical, financial, and scientific data. In one embodiment, every associated term in an associative memory module and vector is also the core term of its own associative memory module and vector, thereby enabling a high dimension many-to-many scored associative relationship network. In certain embodiments, this in turn enables strong comparison to occur between, for example, parts of terms, between terms, and terms and the documents they appear in.

In certain embodiments, the length of associative memory modules and vectors may be limited in order to facilitate faster creation of the relationship network or due memory storage constraints since the length of the vector or module may affect the size of the database and the system's performance capabilities. In other embodiments, an associative memory module or vector may contain as many elements as may be supported. In certain embodiments, the system may present a certain number of terms with a high score, or terms with a score above a certain threshold value in order to best represent the information database queried and to facilitate viewing by a user.

FIG. 5 shows a sample associative memory module for the term "red" 500 from FIG. 4 at a state where the current term being analyzed in the frame 400 is the core term "red" 410. The associative memory module 500 shown has three sections: statistics related to the term 510, statistics related to documents containing the term 520, and statistics related to associated terms 530. In the embodiment displayed, the first section, statistics related to the term 510, may contain information such as the number of occurrences of the term in the text analyzed 511, the number of sentences that contain the term 512, the number of other terms associated with the core term 513, and the number of associations between other terms with the core term 514. Since the associative memory module 500 displayed only contains data through analysis of the term "red" 410 in the first document analyzed in the database (FIG. 3A), the data in FIG. 5 reflects the incomplete analysis. Thus, since the term "red" 410 has occurred only once so far, and in only one sentence 412, the number of occurrences 510 and number of sentences 511 for the term "red" 410 both equal one. Similarly, since all eighteen of the terms analyzed so far are also all of the terms currently in the frame 400, they are all associated 513 with the term "red" 410. Furthermore, since none of these associated terms have yet appeared twice, they are all eighteen individual associations 514 for the term "red" 410.

The document statistics section 520 advantageously identifies documents 521 that contain the term, the number of sentences in the document that contain the term 522, and a score for the document in relation to the term 523. In the sample shown, only one document 524 is listed because it is the only document analyzed that contains the term "red". The document 524 is identified by its title, although any other well known identification system may be used to record document identifications, such as a uniform resource locator ("URL") address. Furthermore, only one sentence 525 that contains the term "red" has been found in the document. Consequently, a score 526 of one has been assigned to that document. In the embodiment shown, the score 526 associated with a document is the number of appearances of the term within the document, although in other embodiments other scoring methods may be used.

The associated terms section 530 includes, but is not limited to, data such associated terms 531, the number of occurrences of each associated term in relation to the core term 532 and the corresponding distance score for the associated term/core term pair 533. In other embodiments, the associated terms section 530 may also include data on the number of sentences processed so far that contain the associated term in relation to the core term and the distance of the associated term to the core term.

Distance scores 533 to measure associations between terms are applied within the moving frame. For example, FIG. 4 shows a three sentence frame 400 surrounding the core term, "red". As the frame 400 and its core term focus 410 moves through the document a calculation is applied to assign distance scores to each term within the frame 400 in relation to the core term 410. A distance score 533 may be calculated by any number of well known methods. Furthermore, in order to give greater value to associated terms in closer proximity to a core term, the distance score values 533 assigned to associated terms as their distance to the core term increases may advantageously be decayed. This may advantageously be applied using the Fibonacci sequence in reverse. In other words, in one embodiment using the Fibonacci sequence in reverse, the distance score from the core term to an associated term is:

$$S_{ij} = \phi^{\Delta x},$$

where:
$S_{ij}$=distance score between core term i and associated term j,
$\phi$=0.618 is the Golden Ratio component "phi"[†], and
[†] $\phi$ is the decimal component of the Golden Ratio $\phi$=1.618034.
$\Delta x = |x_i - x_j|$ is the relative position between core term i and associated term j.

Returning to FIG. 5, the distance score 536 using this equation for the associated term "cardinal" to the term "red," which are neighboring terms ($\Delta x=1$), is $0.618=0.618^1$. Similarly, the distance score 537 for the associated term "bloom" to the term "red" is $0.008=0.618^{10}$, since "bloom" is ten terms away from "red" ($\Delta x=10$). In certain embodiments, as the system encounters a second occurrence between an associated term and a core term separate from the first occurrence, then the system may add the distance score of the second occurrence to the first occurrence in order to keep a running total of the distance score for the association. For example, in FIG. 5, if the system encounters the term "cardinal" 534 again within a frame containing "red", and the distance score for the second occurrence is 0.008, then the system may update the distance score 536 for "cardinal" in the "red" associative memory module 500 to be 0.626=0.618+0.008. In other embodiments, other methods may be used to update a distance score value as the system processes an information database.

Calculations based on Fibonacci's number may be advantageously used because sequences based on the ratio of successive Fibonacci numbers, the Golden Ratio, are found in many natural phenomena, including biology and materials science. Fibonacci's number may thus have a relationship to grammar and human generated patterns and an effect on the interpretation of information.

In another embodiment, the Enhanced Exponentially Weighted Moving Average (EEMA), a variation of the EWMA (Exponentially Weighted Moving Average) time series calculation, may be used to compute distance scores between terms within a frame. A sample equation using the EEMA may be defined as:

$$EEMA = 1/((K*(C-P)+P)$$

Where:
C=Position of the core term
P=Previous period's Simple Moving Average (SMA)
N=Number of periods for EEMA
$K=e^{(-C/5.0)}$ Smoothing constant In yet another embodiment, a standard exponential decay algorithm can be applied. Below are two equations for exponential decay that can be used to calculate distance scores:

If core term i comes before associated term j, then $$Sij = 1/e(j-i)$$

If core term i comes after associated term j, then $$Sij = 1/e(i-j)$$

where Sij=relationship score between object i and j,

FIG. 6A shows the associative memory module 600 for the term "red" after the system completes analysis of the information database containing the document of FIG. 3A. In the sample associative memory module 600, the system has determined that the information database analyzed contains twelve occurrences 611 of the term "red" in a total of twelve sentences 612. Furthermore, there are 319 terms associated with "red" and 450 associations between those terms and "red". Whereas the document "Gardening Journal" 625 contained four sentences 626 totaling four occurrences of "red", the document "Top News Stories" 628 only contained one sentence with one occurrence 630. Additionally, while the associated term "cardinal" 634 had six associations with red for whose individual distance scores summed to equal a total distance score 636 of 4.124, the associated term "paste" 637 only had one associated occurrence with "red" for a total distance score of 0.008.

After the system processes each document in the information database, each associative memory module may be used to create a query object vector. FIG. 6B shows a sample query object vector 650 created from the associative memory module 600 of FIG. 6A. In the embodiment shown, the distance score 633 from the associative memory module 650 is used to calculate the relationship score 653 for the query object vector 650 by emphasizing common associations, as will be discussed in further detail below. The system then ranks the associated terms in the query object vector 650 according to their relationship scores 653. For example, in FIG. 6B, the associated term "Cardinal" 654 is ranked first because it has the highest relationship score and the term "Paste" 655 is ranked at 319, which equals the total number of terms associated with "red," because it has the lowest relationship score. Each associative memory module is thus used to create a query object vector 213.

FIG. 6B thus illustrates one advantage of the systems and methods described herein. In keyword based searches, if a user looking for red sweaters used the term "red" in her query, then she would only receive results where the sweaters were specifically listed with the term "red." On the other hand, if the user submitted the search to an embodiment of the system described herein, the user would not only receive results for "red" sweaters, but for sweaters with other shades of red, such as cardinal, maroon and raspberry.

In certain embodiments, the system may advantageously use data from an associative memory module in order to create a different relationship score values for a query object vector. For example, in one embodiment, the distance score may be modified with the aim of emphasizing unique associations, such as to help in finding hidden relationships. Hidden relationships may be used to assist in hypothesis formulations by presenting a list of possibly important new relationships unknown to the user. In one embodiment, the following uniqueness function may be used to calculate a relationship score emphasizing uniqueness:

$$U_{ij} = S_{ij} \cdot B_{ij}$$

where:
$S_{ij}$=Distance-based relationship score between term i and j
$B_{ij}$=Bias for term i of association with term j,
where:

$$B_{ij} = A_i/A_j$$

$A_i$=Total number of associations of term i
$A_j$=Total number of associations of term j In another embodiment, the distance score may be modified with the aim of emphasizing common associations such as to generate a clear definition based on direct associations. Direct associations can be used to generate a list of very similar objects. In one embodiment, the following commonality function may be used to calculate a relationship score emphasizing commonly associated terms:

$$B_{ij} = A_j/A_i$$

where:
$A_i$=Total number of associations of term i
$A_j$=Total number of associations of term j Thus, by the time the process of FIG. 2 completes, each term in each parsed document will have its own query object vector; i.e., each term will be a core term for a query object vector and an associated term for other term's query object vectors. In certain embodiments, each query object vector may either emphasize unique or common relationships. Furthermore, in certain embodiments, each document will also have its own associate memory module and query object vector. These vectors may then be used to build a relationship network.

2. Building a Relationship Network

Figure 7:
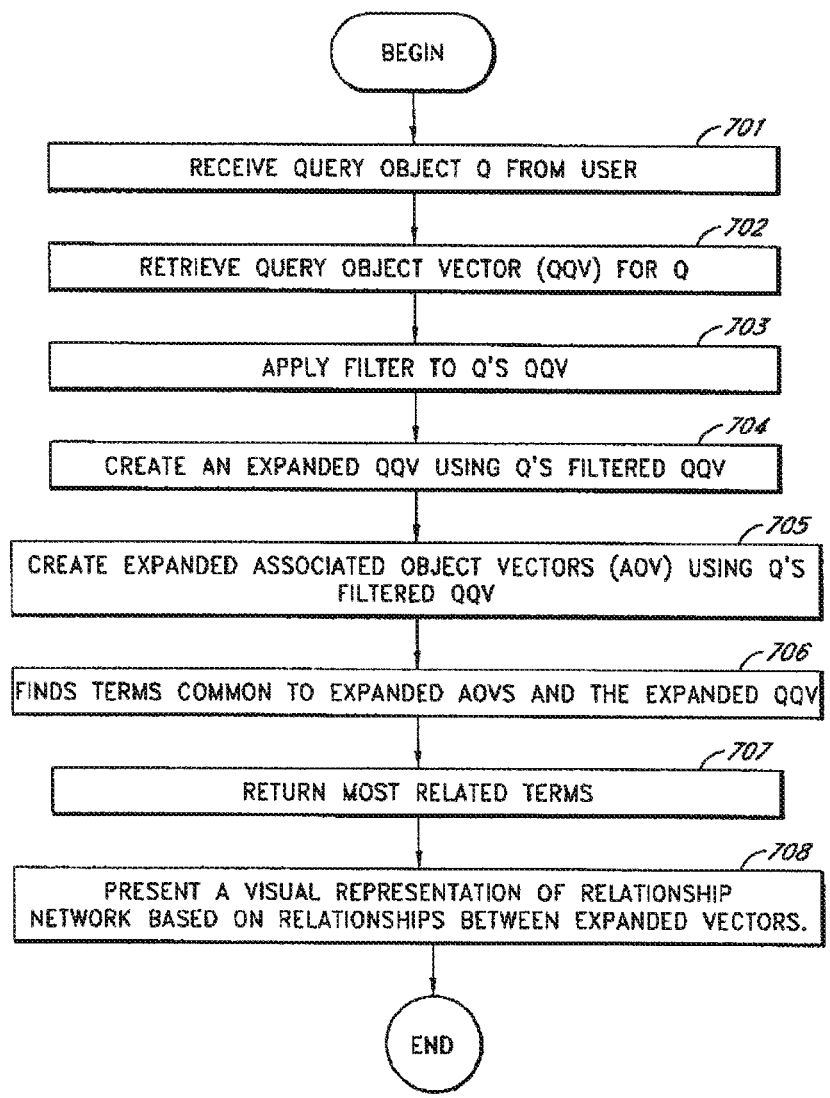
FIG. 7 shows a sample flow chart for a network generation engine.

FIG. 7 shows a process 700 for a network generation engine for use with embodiments of the relationship network discussed above. Specifically, disclosed is one embodiment for generating a relationship network using the query object vectors generated from an electronic information database containing text documents as described above. In response to a search query term inputted by a user, a relationship network may be generated from the extraction of relationships from query object vectors based upon the search query term. In certain embodiments, the relationship network would be comprised of a network of expanded vectors of terms, their connections to each other and the strength of these connections, where the connections are based on shared attributes within a defined frame. Although the sample flow chart illustrated discusses an embodiment using text documents and terms, in other embodiments, the query term may be audio data, video data, image data, or any other kind of electronic data.

First, a user submits at least one query term, Q, to the system at a state 701. In certain embodiments, multiple terms may be submitted to the system, and may be treated as one query term or a multiple of query terms. In certain embodiments, if Q does not exist in the information database, then the system does not return any data. In response to receiving the query, the system retrieves the vector for the query term, the query object vector ("QOV") at a state 702. The process 700 then moves to a state 703 wherein the user or system configures a filter for use with the query in order to focus the query results. This filter may be set, by for example, filtering terms out of the vector retrieved for the search term Q at the state 703. This will be discussed in further detail below with reference to FIG. 8A. Next, the system expands the vector into an expanded QOV at a state 704. This process will be discussed in further detail below with reference to FIG. 8B. The process 700 then moves to a state 705 wherein the system uses the QOV to generate expanded associated object vectors ("AOV"). This will be discussed in further detail below with reference to FIG. 8C. The system then moves to a state 706 to find associated terms between the expanded AOVs and the expanded QOV. Search results for the query Q are then provided at a state 707. The process of providing search results will be discussed below with reference to FIG. 8D. Finally, the process 700 presents a visual representation of the relationship network based on the query results.

In one embodiment, the system uses filters, such as forms of ontology of related themes and categories, to control the kind of relationships derived during the search process and to ensure that terms stay within a certain defined context when the relationship network is being built. In certain embodiments, filters may be employed because the terms selected for the filter also exist in the information database being searched, so the filter terms thus have vectors of their own. The filter may be supplied along with the query in order to focus the query results. The filter can be a list of words, symbols or objects by which the results of a query are controlled. For example, the filter phrase "genes and inferred relationships to drugs" may be used for a genomic search done on an information database related to genetic data.

In certain embodiments, the filter may be a complete vector wherein its elements represent the entire set of frame data or context in a database of documents to control the relationship extraction process. Any search results that are found to intersect with the vector-filter will be processed according to the type of filter used.

Figure 8A:
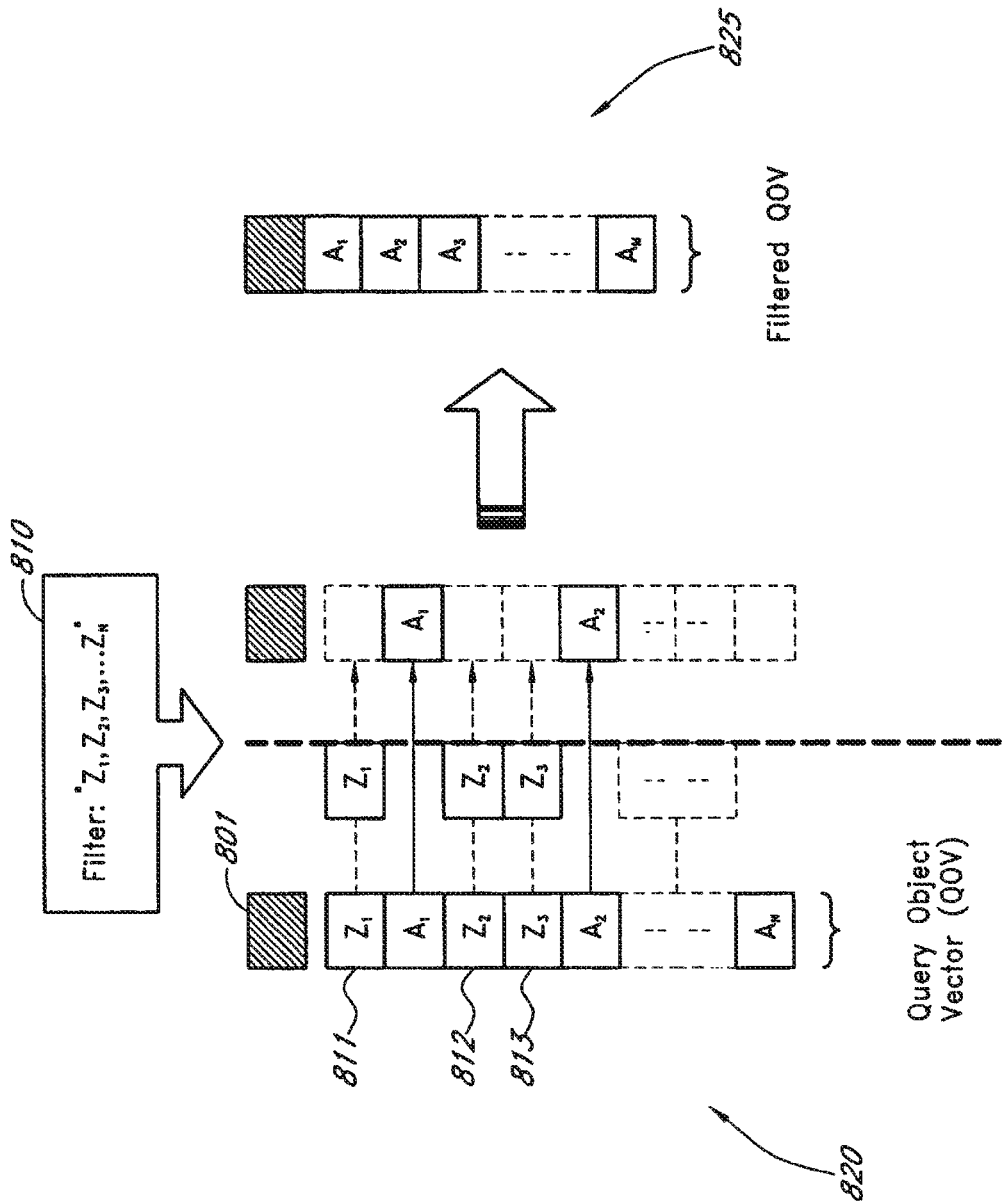
FIG. 8A shows a sample exclusion filter vector applied to a query object vector

Many different kinds of filters may be enlisted for use with the systems and methods disclosed herein. One type of filter, an exclusion filter, can actively remove terms and vectors which do not match the filter. Exclusion filters may be used to assure that elements from a specific theme are removed from the query object vectors and associated object vectors for any aspect of the process. FIG. 8A shows a sample exclusion filter vector 810 containing the terms $Z_1$ to $Z_n$. The filter vector is applied to the query object vector 820 retrieved for query Q 801 in order to focus the results of the query. As shown in FIG. 8A, the system advantageously removes instances of terms that appear in the filter vector. The terms $Z_1$, $Z_2$, and $Z_3$ have been filtered from the final query object vector 825 because those terms appear in the exclusion filter 810.

On the other hand, a selection filter can actively select terms and vectors which match the filter. Selection filters may be used to assure that only elements from a specific theme are used for a specific process. In one embodiment, the process includes the selection of top query term vector elements and associated term vector elements for generation of expanded query term vectors and associated term vectors. Filter elements also effect the selection of final terms being used in the expanded query term vector to expanded associated comparison and association score calculation.

Another type of filter, a weighting filter, may adjust the relationship scores of certain terms and vectors in order cause the terms or vectors to be reordered. Weighing filters may be used to alter the weight of a specific group of terms, thereby affecting their impact on the algorithm process and calculation results.

Filters may advantageously be applied during any point wherein the system is expanding the query object vector retrieved in response to a query. The use of filters results in the ability of the system to base relationships on specific sets of terms which may comprise a theme. Without theme filtering, the system might retrieve inferred relationships of all kinds which may not be beneficial if it is not known what kind of relationships to look for. For example, a user submitting the search query term "red" to an information database without a filter might receive very broad results. On the other hand, if the user employs a selection filter, which would exclude all terms not found in the filter, such as the filter phrase or vector "flowers" as a context for "red," specific terms relating to red colored flora will most likely be found in the query results. In certain embodiments, filters may be predefined and interchangeable in order to allow a user to tailor a search query. Creating a network of term relationships with this kind of context control allows for previously unidentified connections to be brought to the fore as a user of the system might desire to find what relationships to this query term exist in a specified context.

FIG. 8B is a data flow diagram that shows one exemplary method of generating an expanded QOV 850 using the filtered QOV 825 of FIG. 8A. First, the system identifies the thirty strongest terms, $A_1$ to $A_{30}$ 826, related to the query term Q 801. These thirty strongest terms are added to the beginning 826 of the expanded QOV 850. Next, the system retrieves the vectors for each of those thirty terms, $A_1$ to $A_{30}$ 830, and inserts the top three strongest terms in each of those thirty vectors 831 (i.e., $A_{1,1}$ to $A_{1,3}$ for $A_1$, $A_{2,1}$ to $A_{2,3}$ for $A_2$, . . . $A_{10,1}$ to $A_{10,3}$ for $A_{10}$) to complete the expanded QOV 850. Although the embodiment of the system shown selects thirty terms for processing, in other embodiments, any other number of terms may be used for processing.

FIG. 8C is a data flow diagram showing one method of generating an expanded AOV 875 using the filtered QOV 825 of FIG. 8A. First, the system identifies the thirty strongest terms, $A_1$ to $A_{30}$ 826, related to Q 801, retrieves their vectors 827, and begins an expanded AOV 875 for each term $A_1$ to $A_{30}$. Then the system identifies the three strongest terms from the first dimension vectors related to each of $A_1$ to $A_{30}$, (i.e., $A_{1,1}$ to $A_{1,3}$ for $A_1$, $A_{2,1}$ to $A_{2,3}$ for $A_2$, $A_{30,1}$ to $A_{30,3}$ for $A_{30}$) 830, adds those associated terms to the corresponding expanded AOV 875, $A_1$ to $A_{30}$, and retrieves their vectors 831. Similarly, the system retrieves the three strongest terms from the second dimension vectors related to each $A_{1,1}$ to $A_{30,3}$, (i.e., $A_{1,1,1}$ to $A_{1,1,3}$ for $A_{1,1}$, $A_{1,2,1}$ to $A_{1,2,3}$ for $A_{1,2}$, . . . $A_{30,3,1}$ to $A_{30,3,3}$ for $A_{30,3}$) 840 and retrieves their vectors 841. Once more, the system retrieves the three strongest terms from the third dimension related to each $A_{1,1,1}$ to $A_{30,3,3}$ (i.e., $A_{1,1,1,1}$ to $A_{1,1,1,3}$ for $A_{1,1}$, $A_{1,1,2,1}$ to $A_{1,1,2,3}$ for $A_{1,2}$, . . . $A_{30,3,3,1}$ to $A_{30,3,3,3}$ for $A_{30,3,3}$) 850. The top three associated, terms from the third dimension vectors 850 are then inserted after the first dimension terms 830 already in the expanded AOV 875 to complete the expanded AOV 875. Although FIG. 8C shows the generation of an expanded AOV 875 for $A_1$, in the embodiment shown the process produces a total of 30 expanded AOVs for each $A_1$ to $A_{30}$ 826.

Figure 8D:
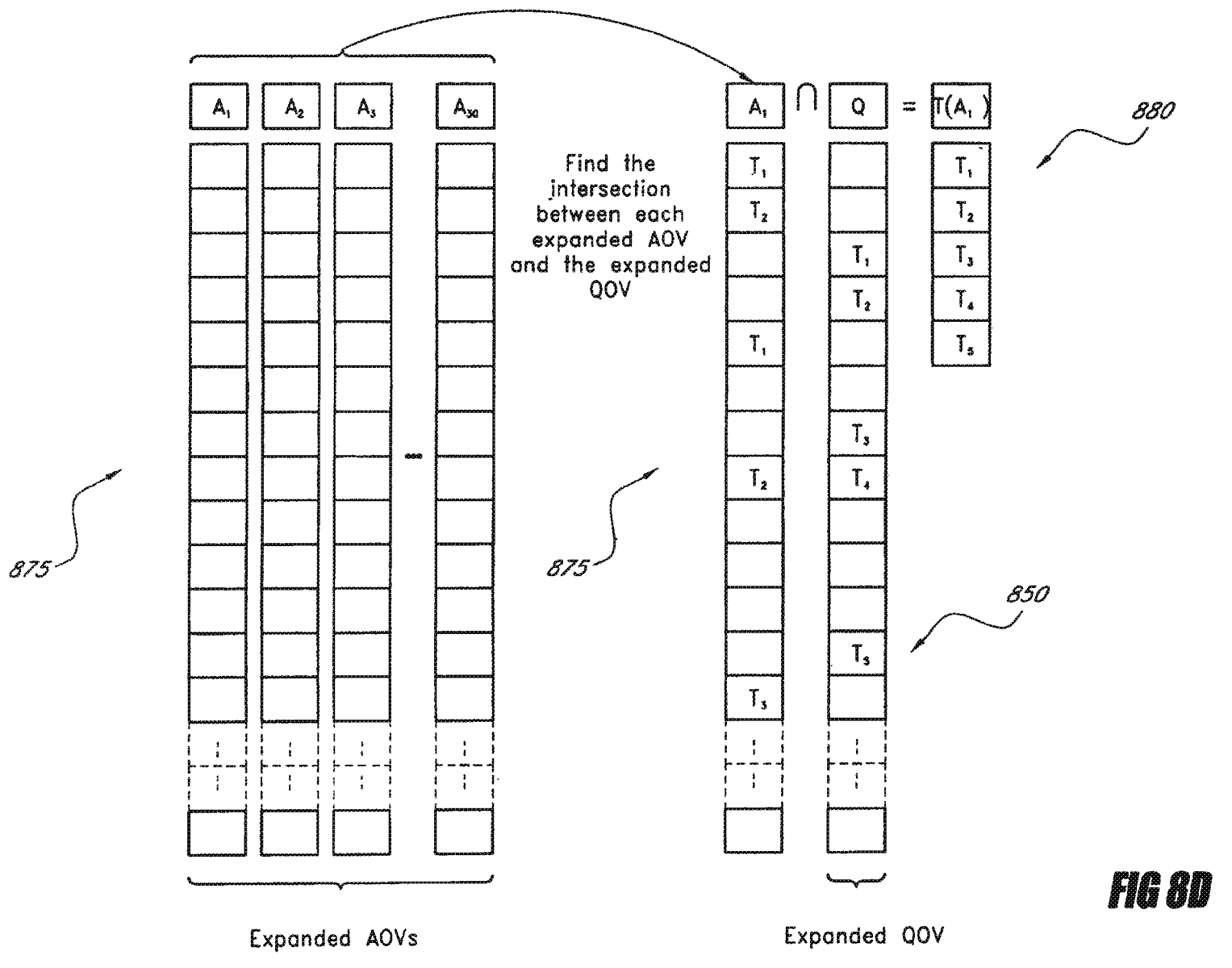

FIG. 8D is a data flow diagram that shows one exemplary method of using expanded AOVs 875 with an expanded QOV 850 to find associated terms between the AOVs 875 and the expanded QOV 850 in order to produce search results for the query Q 801. The expanded vectors 850 and 875 are passed to a function that determines similarity between intersecting terms in the expanded vectors 850 and 875. In one embodiment, as illustrated in FIG. 8D, the system may take the intersection of each expanded AOVs 875 and the QOV 850 in order to locate associated terms 880 for query term Q 801. In other embodiments, other functions may be used to locate associated terms.

In certain embodiments, a similarity score between the query term Q and each associated term may be calculated after associated terms for Q are located. The associated terms may then be ranked by their similarity score values, so that the associated term with the highest similarity score is ranked first. In certain embodiments, the similarity score function may be a correlation coefficient distance measurement and its value can be assigned to the resulting matching terms as a score signifying a final similarity measurement between the associated term and the initial query term, i.e., how much the results match the initial query term.

In one embodiment, the similarity score between two vectors may be calculated by taking the sum of the relationship scores from the intersecting terms and multiplying it by the length of the vector composed only of the intersecting terms. In another embodiment, the similarity score between two vectors may be a correlation coefficient distance measurement function which uses the following equations:

$$n\left(\sum_{i=1}^{n}(V \cap W)_k\right)$$

or $$\|X\|\sum_{i=1}^{n}X_k$$

where $X = (V \cap W)_k$

V=query vector, and
W=any vector compared to the query vector.

In another embodiment, an uncentered Pearson correlation coefficient distance measurement may be used to calculate the similarity score between vectors of different sizes, wherein:

$$r_U = \frac{1}{n}\sum_{i=1}^{n}\left(\frac{x_i}{\sigma_x^{(0)}}\right)\left(\frac{y_i}{\sigma_y^{(0)}}\right)$$

where $$\sigma_x^{(0)} = \sqrt{\frac{1}{n}\sum_{i=1}^{n}x_i^2}$$

and wherein distance is defined by $d_U = 1 - r_U$

In certain embodiments, after the query result terms 880 are located, the vectors of each element returned for the query also extracted and compared and scored for similarity. This step advantageously allows for the results to be networked by intersecting the contents of their vectors. The network created by the intersection may be used to determine how the initial query results are related, in what context they relate, whether their connection is direct or indirect, and the strength of their relationships.

Figure 9:
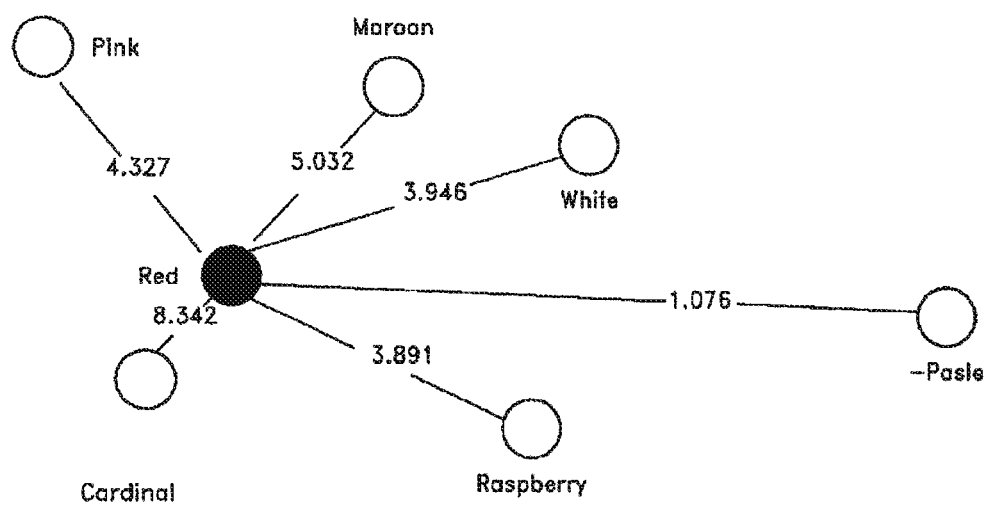
FIG. 9 shows a graph visualization for a relationship network created in response to a query for the term "red.".

The query result data and the relationship network built using that data may thus advantageously show the relationship of the query term 801 to other terms, the relationship of vectors to one another, and the strength of their relationships using a similarity score. In certain embodiments, the resulting relationship network of the query result terms 880 and/or query-related vectors can be visualized if necessary for further interpretation. For example, FIG. 9 shows a graph visualization 900 (not drawn to scale) for a relationship network created in response to a query for the term "red." Terms that have a higher relationship score to the term "red" appear closer to "red," such as "cardinal" 654. Terms with a lower relationship score appear farther away, such as "paste" 655. A user may advantageously use a visualization similar to FIG. 9 in order to quickly understand the relationship between terms in the information database.

3. Example System Components

Figure 10A:
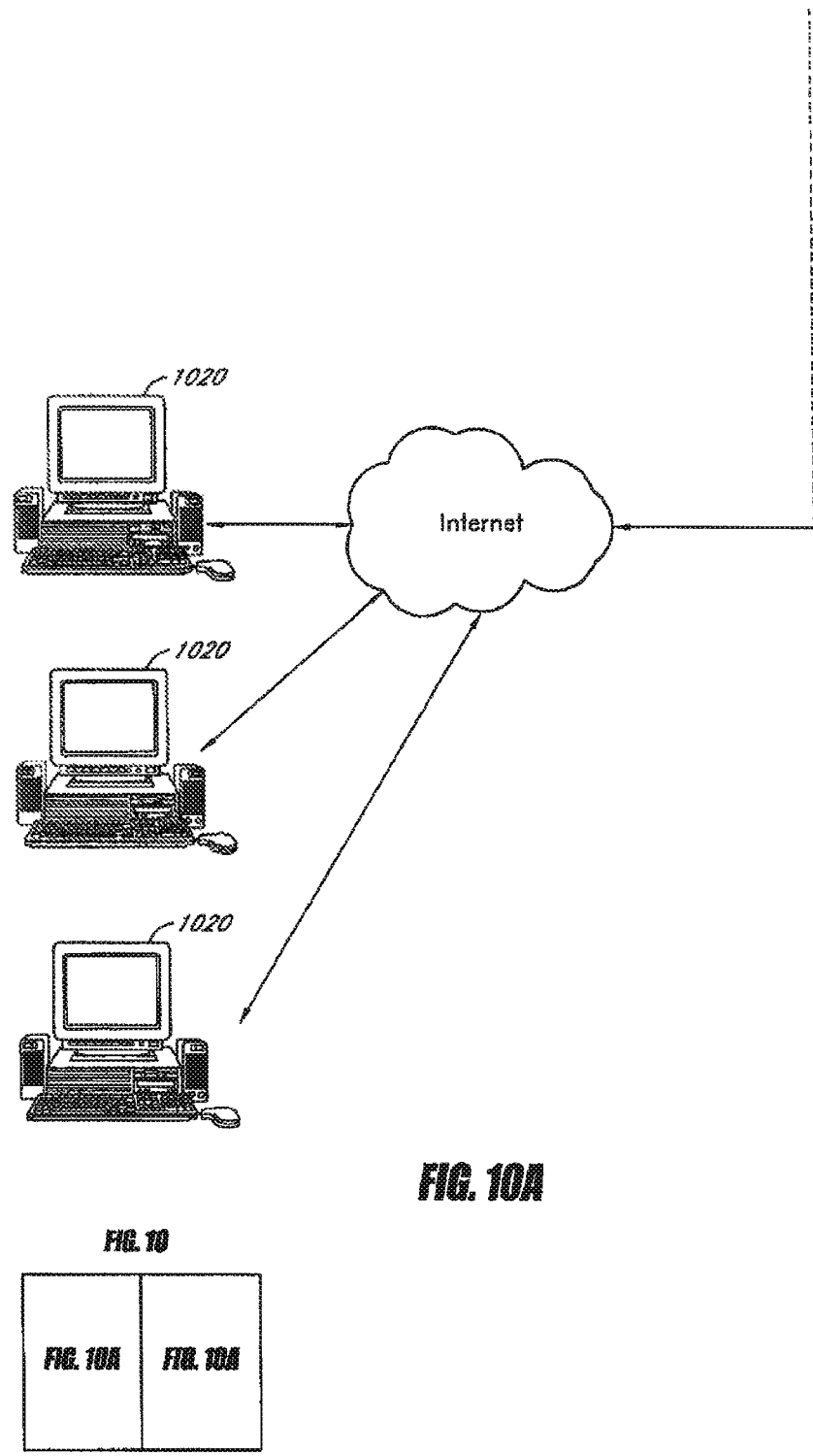
FIG. 10 illustrates a relationship network system according to one embodiment.
Figure 10B:
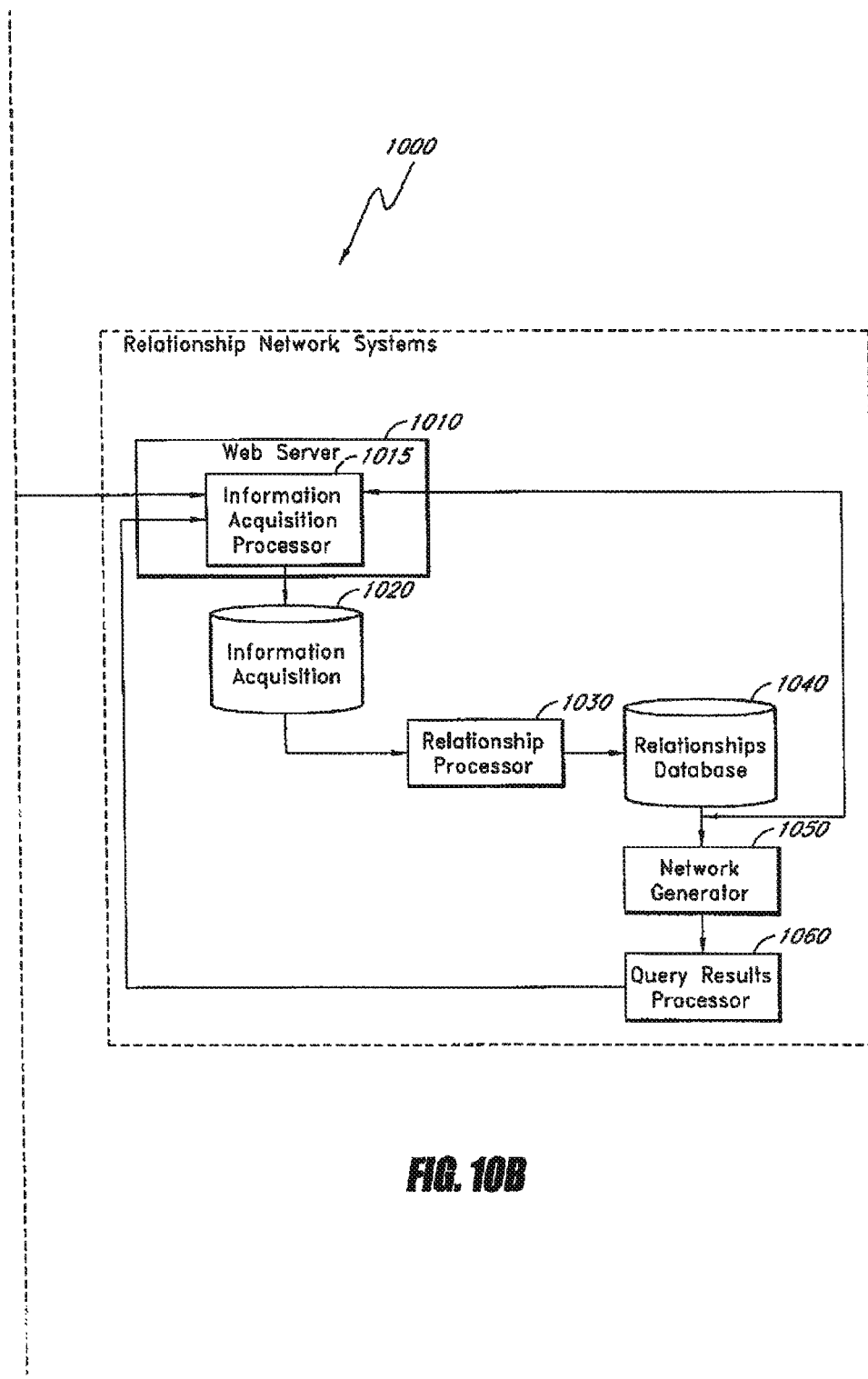

FIG. 10 illustrates a relationship network system 1000 according to one embodiment. The relationship network system 1000 includes a web server 1010 that generates and serves pages of a host web site to computing devices 1020 of end users. Although depicted as desktop computers 1020, the computing devices 1020 may include a variety of other types of devices, such as cellular telephones and Personal Digital Assistants (PDA). The web server 1010 may be implemented as a single physical server or a collection of physical servers. Certain embodiments may alternatively be embodied in another type of multi-user, interactive system, such as an interactive television system, an online services network, or a telephone-based system in which users select items to acquire via telephone keypad entries and/or voice.

The web server 1010 provides user access to electronic information represented within a database or a collection of databases 1020. An information acquisition processor 1015 that runs on, or in association with, the web server provides functionality for users to enter a search query for information they would like to find. In one embodiment, the information represented in the database 1020 may include documents, characters, words, images, songs, or videos or any other data that may be stored electronically. Many hundreds of thousands or millions of bytes of data may be stored in the database.

In one embodiment, a document or other object in the information database 1020 may be retrieved using the information acquisition processor 1015. Each object may be located by, for example, conducting a search for the item via the information acquisition processor 1015, or by selecting the object from a browse tree listing.

As illustrated in FIG. 10, the relationship network system 1000 includes a relationship processor 1030 which is responsible for, among other tasks, creating relationship vectors for the data in the information database 1020. These relationship vectors are then stored in the relationships database 1040. In certain embodiments, the relationship processor 1030 runs periodically and collectively analyzes or "mines" the information database in order to create and maintain the relationships database 1040 in response to new data that may be stored in the information database 1020.

In response to a query received by the information acquisition processor 1015, the relationship network system 1000 sends the query to the network generator 1050, which in addition to the query receives relationship vector information from the relationships database 1030 in order to generate a relationship network based on the query. In certain relationship network system embodiments, a set limit can be placed on the number of relationships that are created in order to address the substantially large amounts of relationships that can be created in web space, as discussed above.

The resulting relationship network is then sent to the query results processor 1060, which processes the results, optionally creates a visual representation of the relationship network, and sends this data to the information acquisition processor 1015. The results data may then be returned to computing devices 1020 that submitted the query via the Internet.

4. Example: Music Database

In some embodiments, a system may be implemented to discover relationships between human-generated content related to a database of music. Some examples of human-generated content relating to music are playlists, blogs, and recommendation lists. The system may determine relationships between music files based on their location within a directory or repository over a large data space, such as the Internet. This relationship data, which may include information such as the artist, album, title of the song and year of release, may be stored in associative memory modules, and then be transferred into query object vectors, as described above. Then, in response to a query, such as for an artist or a song, the system may create and present a relationship network of related artists or songs to the query and optionally visualize the relationship network.

5. Generating a Video Playlist

Figure 11:
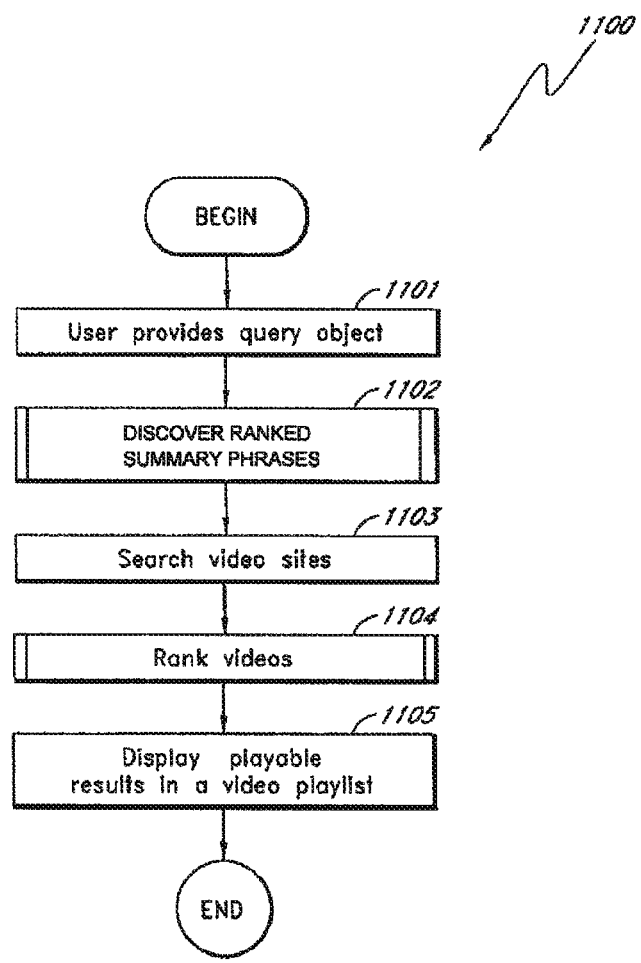
FIG. 11 is a flow chart for one embodiment of a process for generating a video playlist.

FIG. 11 is a flow chart showing one embodiment of a process 1100 for generating a video playlist. While this example is described with reference to playable video data, in other embodiments different types of media may be retrieved and displayed, such as audio data, images, and the like.

Initially, a user provides a query term or object at state 1101. For example, a user's search query is received by a server. Based on the query object, ranked summary phrases are discovered at process state 1102 related to the query term. In some embodiments, the server may therefore have a first module configured to perform first search by querying a plurality of Internet search engines to retrieve additional terms. More information on the process state 1102 can be found in FIG. 12. At state 1103, video storage sites (which may also be referred to as video storage locations) are queried based on the ranked summary phrases. Accordingly, in some embodiments the server may have a second module configured to return a list of playable media objects from media storage locations or web sites based on the additional search terms. The returned videos are ranked at process state 1104 (described in more detail with respect to FIG. 17) and displayed in a playlist at state 1105. For example, a user interested in creating a playlist of music videos according to one embodiment may enter a search term into a web browser corresponding to a song name. The song name is used to discover a number of ranked phrases that are contextually related to that song name. Those ranked phrases may then be used to search video storage websites and rank the returned videos. The top returned playable video objects are displayed in a custom playlist containing playable media objects related to the user provided song name.

Figure 12:
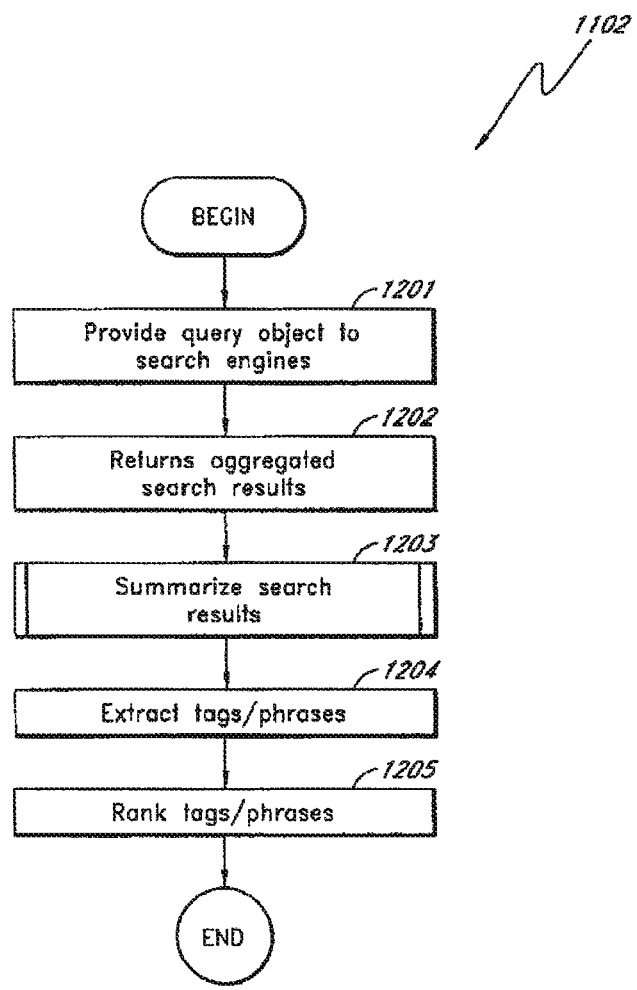
FIG. 12 is a flow chart for one embodiment of a process for discovering and ranking summaries of search results.

FIG. 12 is a flow chart of one embodiment of the process 1102 for discovering ranked summary phrases. The process 1102 begins at state 1201 where the user query object from state 1101 of process 1100 is provided to one or more Internet search engines. For example, the query object may be processed by the GOGGLE, YAHOO!, MSN, and SEEQPOD search engines, and the search result pages found by each of them may be retrieved and combined. The process 1102 then moves to state 1202 where aggregated search results are returned.

In some embodiments, these aggregated search results are ranked. In certain embodiments, any result retrieved by multiple search engines is only included once in the ranked results. Rankings may be generated by matching the context of each search result to the context of the query. This may be done according to the methods taught above, especially with reference to FIG. 8D. For example, a context for the search results may be determined by constructing relationship vectors for each result. The contextually based relationship vector of the user query object may be constructed from pre-processed sources such as dictionaries, encyclopedias, on-line articles, on-line knowledge bases such as Wikipedia, and the like. In other embodiments, the relationship vector of the user query object may be constructed from the aggregated search results. The similarity scores generated by comparing the query term's relationship vector to the relationship vectors of the search results may then be used to score each search result. In other embodiments, the search results may be ranked according to some other method, such as a keyword search ranking in which the document having the most occurrences of the user query object is ranked first. In some embodiments, the search results are not ranked.

At process state 1203, each returned search result is summarized. More information on the process state 1203 can be found in FIG. 13. The process of summarizing the search results at process state 1203 may include generating relationship vectors for each search result as described above. If the results are ranked, then the relationship vectors may have been stored and can be quickly retrieved. To create a summary using these relationship vectors, each section of the page is scored based upon the relationship scores of terms within that section. Sections of the page may include paragraphs, sentences, phrases, or the like. Scoring may be accomplished, for example, by summing the relationship scores of a term's QOV, and then summing these values for each term in a section. The highest scoring sections contain high-value, contextually-associated words and make up a summary. This process is repeated for each search result.

At state 1204, each term from the summaries is extracted and used to form tags for its corresponding search result. Tags extracted from the summary are expanded into multi-word phrases to be used in conjunction with the tags to provide better contextual matching between the search results and media objects. In some embodiments, phrases may be valued more highly than the individual terms that comprise them. For example, in certain contexts the term 'cat litter' may be more relevant than the individual words 'cat' and 'litter'. Tags are expanded into multi-word phrases by combining the tags extracted from the summary with other highly relevant words. These other words may be obtained from a relationship network of the search result, a relationship network of a general knowledge database for the given tag, or some other source. Thus, an actual page may refer only to sand used in a cat hygiene product, but the phrase 'cat litter' may nonetheless be identified as an important multi-word phrase based upon a general relationship network. In other embodiments, the tags extracted from the summaries at state 1204 may be used without creating multi-word phrases.

At state 1205, the extracted tags and phrases are ranked. In some embodiments, relationship vectors corresponding to the extracted tags and phrases are compared with the relationship vector of the user query object and a similarity score is determined. The extracted tags and phrases may then be ranked based upon the similarity scores. Extracted tags and phrases may also be ranked in some embodiments based upon, for example, the scores determined at state 1203.

Figure 13:
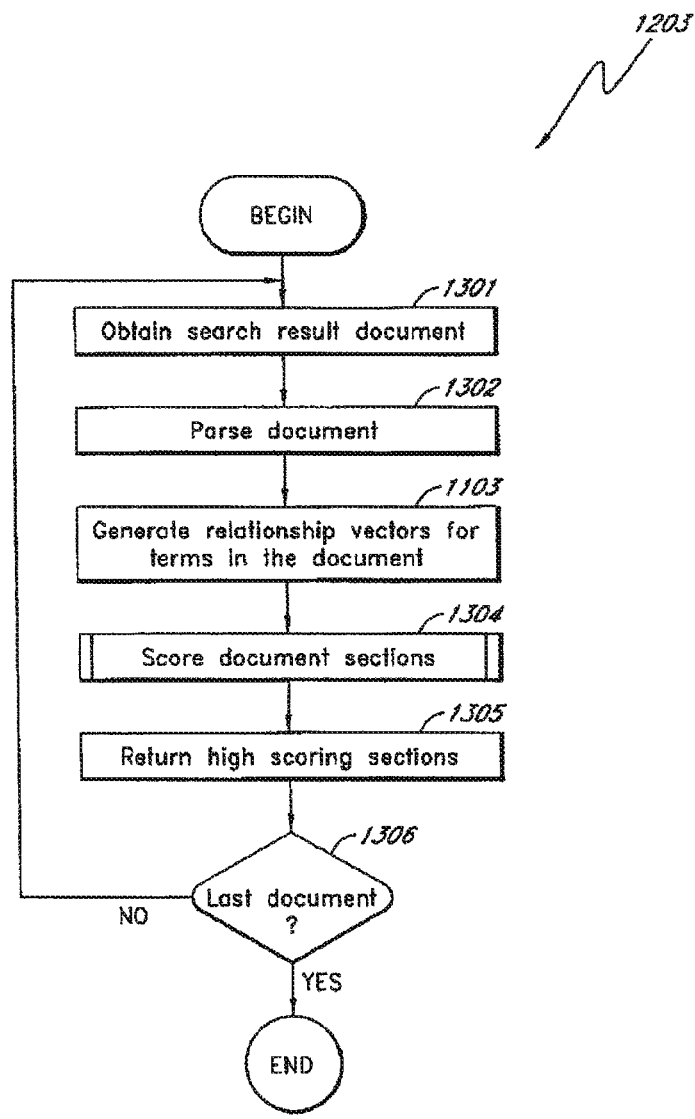
FIG. 13 is a flow chart for one embodiment of a system for summarizing objects in an electronic database.

FIG. 13 is a flow chart showing a more detailed view of one embodiment of a process 1203 for generating summaries of documents returned as search results. In other embodiments, this process may be used to create summaries of objects in an electronic database that are independently useful, without using those summaries to generate a media playlist. In certain embodiments, an electronic database may include, but is not limited to, a collection of characters or other forms of text, images, audio, video, or any other data that may be analyzed electronically. Objects or terms within the electronic database may thus be documents, paragraphs, sentences, characters, words, images, songs, or videos.

In the embodiment illustrated, the system first obtains a search result document to process at state 1301. For example, the document may be the highest ranking document after the aggregated search results have been ranked. In other embodiments, the document selected may be chosen using another method, such as selecting documents alphabetically based on their titles, selecting documents based on size, or the like.

The system parses or normalizes the document at state 1302. In some embodiments, normalization includes extracting the plain text content, stopword removal, stemming, and filtering. Extracting the plain text may include removing HTML syntax or the like. The process of stopword removal involves removing commonly occurring words that are of low value (e.g. a, of, as, the, on, etc.) so that the information database contains only valuable terms. Stemming replaces a word that is in a plural or verb form with its root. Filtering may include removing words from an undesired words list. While these processes have been described with respect to textual information, the other embodiments may not be limited to text-based data. Similar concepts may be applied to other types of data, for example media data, to create a narrowed document that contains only useful information.

At state 1303 the system generates relationship vectors representing the document, as described above. The relationship vectors are used to score sections of the document at process state 1304 (described in more detail with respect to FIG. 14) to determine the most relevant sections. The relationship vectors provide information as to the relative uniqueness of terms and the relationship between terms, which may serve as a basis for scoring. Sections of an object containing many terms that have a high relationship score or a high density of such terms will in turn be scored highly. To determine which sections are most relevant, the section scores are compared. In general, the sections with the highest scores will be the most relevant. In other embodiments, the section score may be further modified before ranking the sections. For example, the section score may be compared to the number of terms in the section.

At state 1305 this scoring may be used to create a summary of the document by returning the most relevant sections to the user as a summary of the object. The sections may be returned in order of relevance, in the order they appear in the object, or based on some other factor. The system may also return a quantitative measure of the relevance of each section based on its section score. At decision state 1306, the system determines if any more documents remain to be summarized. If any do, then process 1203 returns to state 1301 and selects a new document. Otherwise, process 1203 ends.

Figure 14:
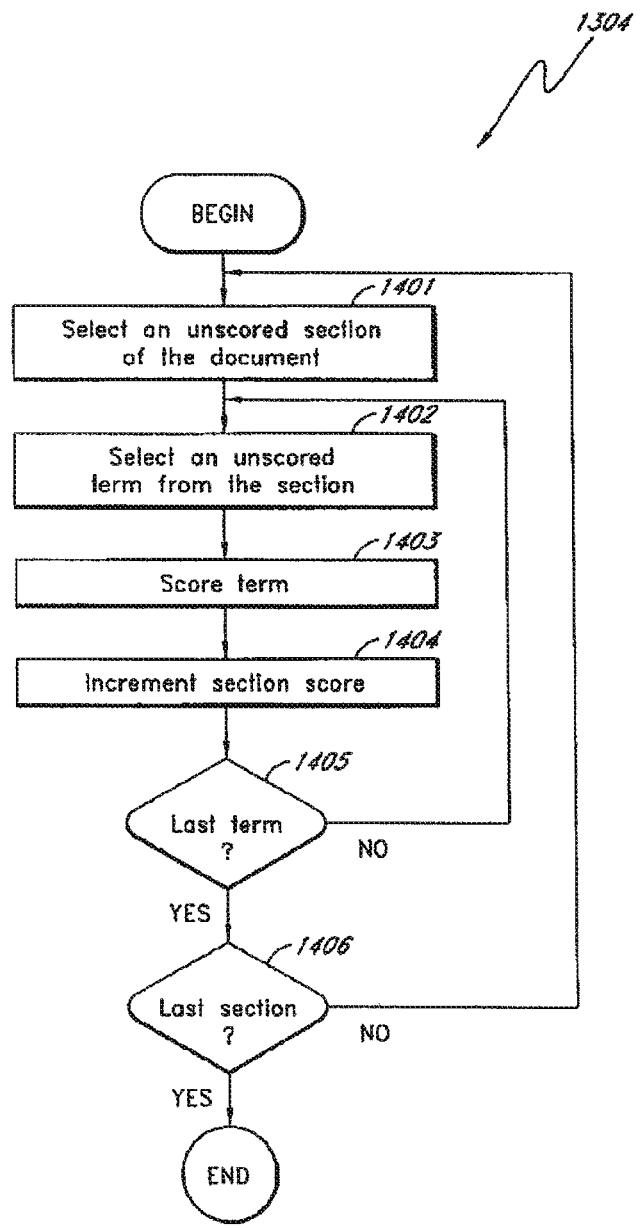
FIG. 14 is a flow chart for one embodiment of a system for scoring sections of an object in an electronic database.

FIG. 14 is a flow chart showing more detail of one embodiment of the process 1304 for scoring sections of a document. At state 1401, a section that has not been scored is selected from the document. Sections may be sentences, paragraphs, phrases, entire documents, or some other portion of the object. For example, the document 300 shown in FIG. 3A may have been returned as a search result. That document is now selected to be summarized in the current example. Since none of the sections have yet been scored, the first section is selected. In this example, sentences are used as sections and each sentence is shown on a separate line. FIG. 15 shows a first section selected according to state 1401, and the first term 431 of that section according to state 1402. In this example, that term 431 is "bloom."

Next, process 1304 scores the selected term at state 1403. The term may be scored utilizing the relationship vectors generated in process 1203 at state 1303. For example, the relationship vector may be a QOV having a core term identical to the selected term, such as the sample QOV 1600 shown in FIG. 16. The QOV 1600 further includes a number of associated terms 1602 with rankings 1601 based upon relationship scores 1603. The relationship scores 1603 are used to calculate the term score. In one embodiment, the relationship score for each of the associated terms is summed to provide the term score. Thus the term score of the core term represented by QOV 1600 would be $S_1+S_2+ \ldots +S_N$. In other embodiments, sections may be scored using alternative methods. For example, information in an associated memory module may be used to form relationship scores for terms without forming QOVs for those terms. The section score may also be determined according to an algorithm other than summing the relationship scores of the terms in the section. For example, the term frequency of a particular term across a document may be compared with the term frequency across a section and also with the number of terms shared by the document and the section, and the resulting score may be a function of these variables. In other embodiments, certain phrases are given higher scores than the sum of the term scores that comprise these phrases.

The term score is used at state 1404 to increment the section score. Initially, the section score is zero, and thus the new section score after processing the first term will be equal to the term score.

Proceeding to decision block 1405, the system determines if the selected term is the last term in the selected section. If there are more terms, then the process 1304 returns to state 1402 and selects the next unscored term 432 from the currently selected section. In the sample shown in FIG. 15, that term 432 would be "March." Process 1304 then loops through states 1402, 1403, and 1404 until the last term 433 in the selected section is scored. In the example shown in FIG. 15, that term 433 would be "fall." For each term, a term score is calculated by summing the relationship scores of the previously generated QOV for that term. The section score is incremented with each term, so that the section score is the sum of all of the term scores for the terms in the selected section. When the last term is reached, process 1304 proceeds to decision block 1406.

At decision block 1406, the system determines if the selected section is the last section in the document. If the section is not the last, then the process 1304 returns to state 1401 and selects the next unscored section from the document. In FIG. 15 that section 422 is the second sentence which is represented on the second line. This newly selected section 422 proceeds through process 1304 in the same way as the previous section, calculating the section score by summing the term scores, which are generated from the relationship scores. When the new section is selected, it is associated with a new section score that is initially zero. After every term in the section has been scored and the section score is computed, the process 1304 returns to decision block 1406. If the selected section is the final section in the object being analyzed, then process 1304 ends and process 1203 proceeds to state 1305 of process 1203, where the most relevant section are returned as summaries.

Figure 17:
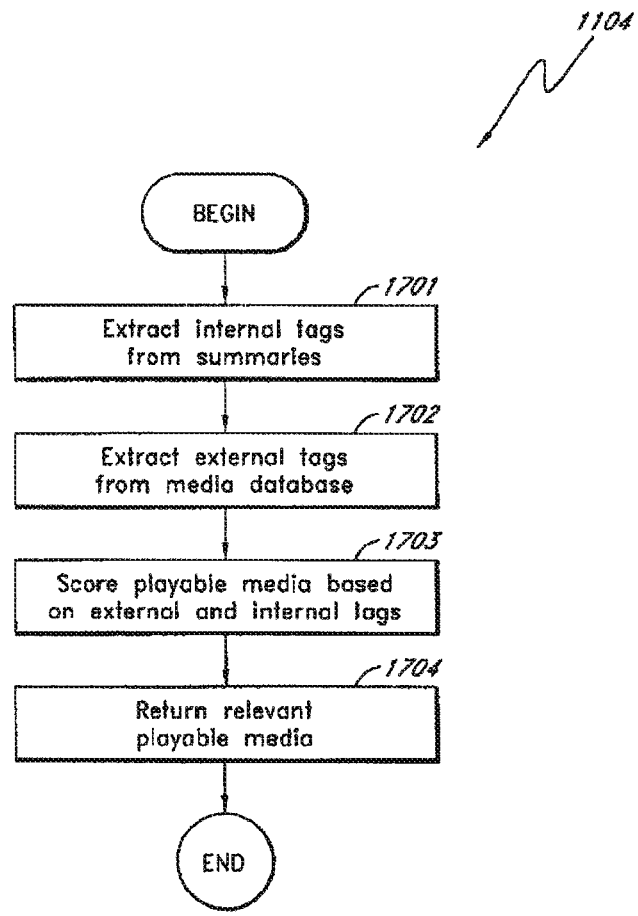
FIG. 17 is a flow chart for one embodiment of a system for retrieving media related to an object in an electronic database.

FIG. 17 shows process 1104 for ranking playable media content related to the user search query object provided at state 1101 of process 1100 according to one embodiment. Beginning at state 1701, internal tags are extracted related to the query object being analyzed. In a preferred embodiment, this step comprises returning the ranked summary tags and phrases from state 1102 of the process 1100 as internal tags.

At state 1702 external tags are extracted from one or more media databases. In a preferred embodiment, the media databases correspond to one or more video storage sites such as YOUTUBE, GOOGLE VIDEO, AOL VIDEO, ZIPPYVIDEO, BRIGHCOVE, YAHOO! VIDEO, or the like. External tags are extracted by analyzing data on the video storage sites related to the playable videos returned from searching the video storage sites at state 1103 of process 1100. The collection of data associated with a playable video is analyzed to determine the most significant terms and phrases associated with that playable video, and these terms and phrases may be returned as external tags. In some embodiments, the external tags may be determined by summarizing the data associated with the playable video as described above. Though this process is generally described for playable videos, in some embodiments other media databases that correspond to different types of media may be utilized. For example, playable audio files may be discovered according to this process and utilized in forming a music playlist.

At state 1703 the playable videos are scored. Playable videos are scored according to the strength of the relationship between each playable video's external tags and the internal tags. For example, the playable videos may be scored based upon the contextual similarity between each summary phrase and playable video relationship network. Relationship vectors for the tags and multi-word phrases may be compared to the relationship vectors of the videos according to the process described above, for example with respect to FIG. 8D. Thus, similarity scores may be generated for the vectors. The vectors associated with each tag or phrase may be compared with the vectors associated with each video, and a quantitative representation of the strength of the relationship may be derived from a function of the similarity scores. In some embodiments, relationships with higher ranking tags and phrases will be scored more heavily than those with lower ranking tags and phrases.

While one embodiment of the system utilizes vector based relationship matching to rank playable videos associated with the summaries, other embodiments may not be limited to this particular technique. In these other embodiments, matching a query object to a playable video may be based on a keyword search. For example, the ranked tags and phrases may be used as keywords and the playable videos returned from the video storage sites may be re-ranked based on the number of keyword hits for each playable video.

Those playable videos determined to be most relevant to the user query object may be returned at state 1705. The process 1104 then ends and the process 1100 continues to state 1105 where a video playlist is displayed.

Figure 18:
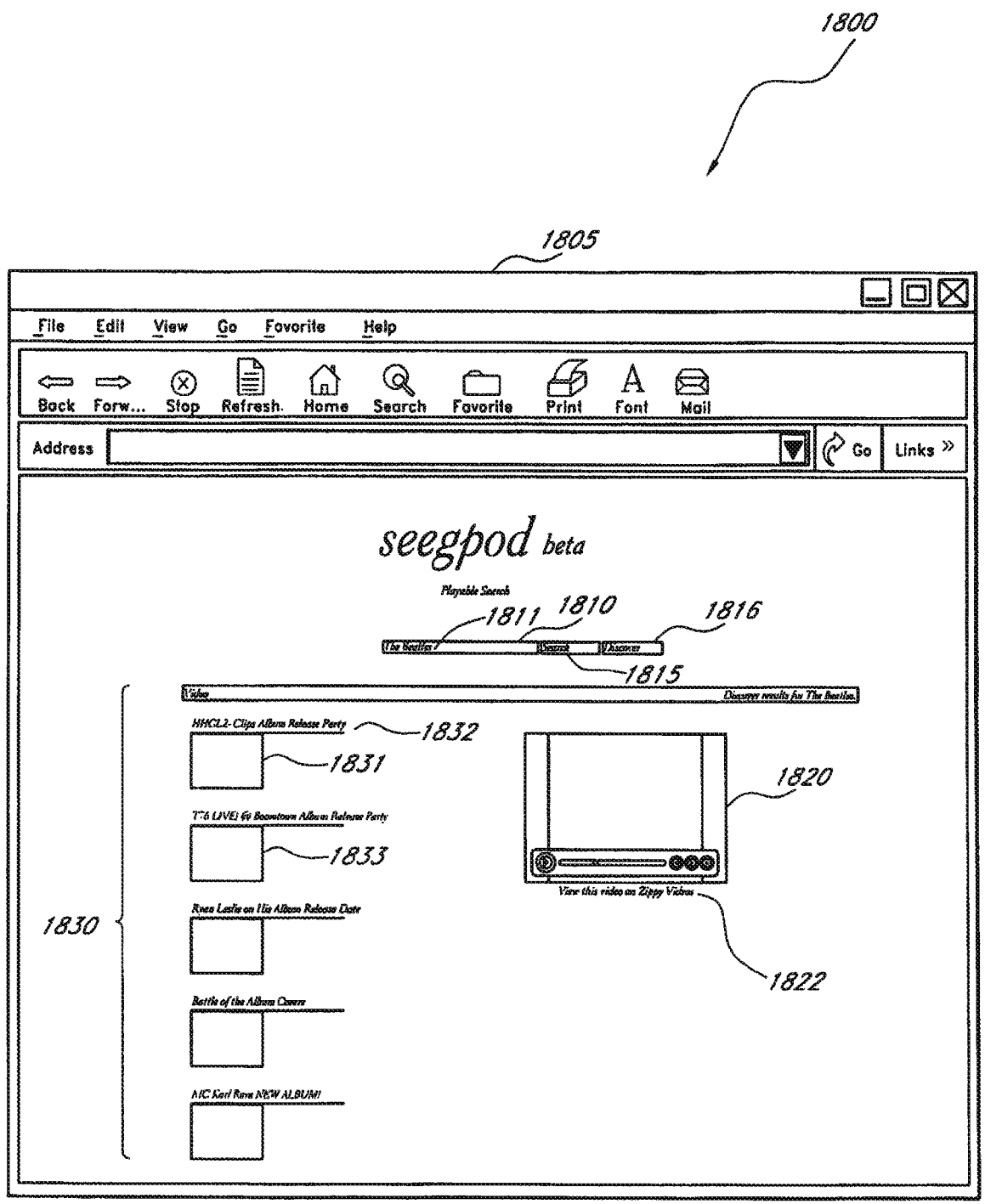
FIG. 18 shows a sample user video playlist created according to one embodiment.

An example of one embodiment of a video playlist is shown in FIG. 18. Video playlist 1800 comprises an Internet browser including search engine tools and the returned video playlist.

The search engine tools include a search entry text box 1810, a search button 1815, and a discover button 1816. In the embodiment shown, the search term 1811 corresponds to "The Beatles." In some embodiments, the search button 1815 corresponds to a key word or relationship based Internet search. For example, a user entering the search term 1811 and then selecting the search button 1815 would retrieve a collection of playable videos directly related to the term 1811. Here, with the term 1811 being "The Beatles," the returned playlist would correspond almost entirely to Beatles' songs, music videos, videos, or the like. In addition, the results are likely to include videos related to the members of The Beatles.

In some embodiments, the discover button 1816 generates a playlist of playable videos that are contextually related to the query term 1811. Selecting the discover button 1816 may induce a server hosting the playlist search page to perform the steps of process 1100 in order to return the video playlist page 1800. For example, using the discover button 1816 may return a playlist including artists that have been compared to The Beatles, music videos that have been compared to The Beatles, or other videos that are somehow related to The Beatles or their musical style. The returned playable videos may therefore correspond to recommendations, and the playlist may correspond to a personalized video channel.

The video playlist portion of the results page 1800 comprises a listing 1830 of a number of videos that correspond to the playlist. The listing 1830 shown includes five videos indicated by the thumbnail image representations of the videos. Of course, any number of videos may be displayed in the listing 1830. The videos may, for example, be organized according to an order in which they will be played. For example, the next video 1831 is shown at the top of the page. Video 1831 has a corresponding text hyperlink 1832 that may direct the user to a website from which the video was obtained. The video 1833 is listed below the first video 1831, and may play after the video 1831. In some embodiments, selecting the video 1833 or some other video in the listing 1830 may cause that video to be played.

The playlist portion of the results page 1800 further includes a video player 1820. Video player 1820 may be implemented, for example, utilizing Flash video controls embedded in a web browser. The video player 1820 may link to videos hosted by video storage sites such as YOUTUBE, ZIPPY VIDEOS, GOOGLE VIDEOS, or the like. In a preferred embodiment, video player 1820 is capable of playing each of the videos in the playlist 1830 within the browser 1800. Video player 1820 further comprises a set of video controls, including standard controls such as volume, play, stop, pause, and the like. In some embodiments, the video player 1820 is dynamically sized to fit within the browser 1800. In other embodiments, the video player 1820 may be sized by the user. In other embodiments, the video player 1820 has a predetermined size within the browser 1800. A text hyperlink 1822 may also be provided in some embodiments to allow a user to load the video storage service website for the video currently loaded in the video player 1820.

Other formats for a video playlist may be utilized besides those shown with respect to FIG. 18 above. For example, the layout of the video playlist website 1800 may be modified. In some embodiments, the listing 1830 is comprised of a textual representation of each of the returned videos and may include other data related to the videos such as playtimes, summaries, or the like. In some embodiments, the website 1800 does not include a search engine section. In some embodiments, the website 1800 returns other types of playable media, such as music files.

CONCLUSION

All of the features described above may be embodied in, and automated by, software modules executed by general purpose computers. The software modules may be stored in any type of computer storage device or medium. All combinations of the various embodiments and features described herein fall within the scope of the present invention.

Although the various inventive features and services have been described in terms of certain preferred embodiments, other embodiments that are apparent to those of ordinary skill in the art, including embodiments which do not provide all of the benefits and features set forth herein and do not address all of the problems set forth herein, are also within the scope of this invention.

What is claimed is:

1. A computer system for returning a list of content of a predefined type to a user, comprising:
 a server configured to receive a search query object from the user;
 a first module configured to identify additional terms related to the search query object by providing the search query object to at least one Internet search engine and processing results returned by the Internet search engine, wherein the processing includes:
  receiving a page identified in the results returned by the Internet search engine,
  parsing the received page to extract terms from the page and identify sections in the page,
  generating relationship vectors based on the extracted terms,
  scoring sections of the received page based on the generated relationship vectors, and
  selecting additional terms based at least in part on the scores; and
 a second module configured to query one or more remote storage locations based on the identified additional terms to obtain a list of content of the predefined type stored on the one or more remote storage locations.

2. The computer system of claim 1, wherein the list of content of the predefined type comprises a list of links to playable media objects configured to be played in an Internet browser.

3. The computer system of claim 2, further comprising a third module configured to play the playable media objects in an Internet browser.

4. The computer system of claim 1, wherein the second module is configured to rank content of the predefined type based at least in part on the identified additional terms.

5. The computer system of claim 1, wherein at least one of the identified additional terms comprises a multi-word phrase contextually related to the search query object.

6. The computer system of claim 1, wherein the identified additional terms are ranked based on their contextual relationship with the search query object.

7. The computer system of claim 6, wherein the identified additional terms are ranked based at least in part on a relationship network corresponding to the search query object.

8. The computer system of claim 7, wherein the relationship network is generated from a pre-existing knowledge-base.

9. The computer system of claim 7, wherein the relationship network is generated by comparing a pre-existing knowledge base with the search query object.

10. The computer system of claim 1, wherein the second module is further configured to query a plurality of the remote storage locations in order to generate the list of content of the predefined type, and wherein the second module is configured to aggregate the query results and rank the query results in the list of content of the predefined type.

11. The computer system of claim 1, wherein the content of the predefined type comprises playable videos.

12. A computer implemented method of generating a list of content of a predefined type, the method comprising:
 receiving a search query object;
 querying at least one Internet search engine with the search query object;
 generating additional terms related to the search query object based on results returned by the Internet search engine, further comprising:
  receiving a page identified in the results returned by the Internet search engine,
  parsing the received page to extract terms from the page,
  selecting additional terms based at least in part on scores generated from relationship vectors based on the extracted terms; and
 identifying one or more remote storage locations having content of the predefined type based on the additional terms.

13. The method of claim 12, further comprising providing links to the one or more remote storage locations having content of the predefined type.

14. The method of claim 12, further comprising transmitting one or more pieces of content of the predefined type in response to a user request.

15. The method of claim 12, wherein generating additional terms comprises:
 aggregating the results returned by the Internet search engine;
 ranking the aggregated results based on relationship vectors associated with the aggregated results;
 generating multi-word phrases based on the ranked aggregated results, wherein the multi-word phrases comprise at least some of the additional terms.

16. The method of claim 12, wherein the additional terms are ranked.

17. The method of claim 12, wherein identifying remote storage locations comprises extracting metadata corresponding to the content of the predefined type and comparing the additional terms to the extracted metadata.

18. The method of claim 17, wherein the content of the predefined type comprises playable media content, and wherein the metadata comprises at least one type of data selected from the group of: a title, a summary, a playtime, a genre, a rating, a creation date, an artist, and a script.

* * * * *